(12) United States Patent
Garceau et al.

(10) Patent No.: US 9,446,703 B1
(45) Date of Patent: Sep. 20, 2016

(54) SLIDABLE ROOM ASSEMBLY

(71) Applicant: NORCO INDUSTRIES, INC., Compton, CA (US)

(72) Inventors: Bernard F. Garceau, Vandalia, MI (US); Timothy Belle, Edwardsburg, MI (US); Bori Krobot, LaPorte, IN (US)

(73) Assignee: Norco Industries, Inc., Compton, CA (US)

( * ) Notice: Subject to any disclaimer, the term of this patent is extended or adjusted under 35 U.S.C. 154(b) by 0 days.

(21) Appl. No.: 14/733,404

(22) Filed: Jun. 8, 2015

Related U.S. Application Data

(63) Continuation of application No. 14/209,702, filed on Mar. 13, 2014, now Pat. No. 9,050,923.

(60) Provisional application No. 61/783,449, filed on Mar. 14, 2013.

(51) Int. Cl.
*B60P 3/34* (2006.01)

(52) U.S. Cl.
CPC ........................................ *B60P 3/34* (2013.01)

(58) Field of Classification Search
CPC .... F16H 2037/088; F16H 37/00; F16H 3/66; F16H 47/04; Y10T 74/19219; B60P 3/34; B60P 3/36; B60Q 9/008; B60R 2001/1253; B60R 1/00
USPC ................... 296/26.13, 165, 171, 175, 26.01
See application file for complete search history.

(56) References Cited

U.S. PATENT DOCUMENTS

| | | |
|---|---|---|
| 882,258 A | 3/1908 | Merritt |
| 1,513,227 A | 10/1924 | Cornelius et al. |
| 2,561,921 A | 7/1951 | Guillot |
| 2,729,497 A | 1/1956 | Runyan |
| 2,744,781 A | 5/1956 | Black |
| 2,857,197 A | 10/1958 | Hogg |
| 2,877,509 A | 3/1959 | Kilbanow |
| 2,898,144 A | 8/1959 | Ferrera |
| 2,902,312 A | 9/1959 | Ferrera |
| 2,987,342 A | 6/1961 | Meaker et al. |
| 3,341,986 A | 9/1967 | Brosig |
| 3,582,130 A | 6/1971 | Borskey |
| 3,707,889 A * | 1/1973 | Kitajima ................ F16H 1/16 192/150 |
| 3,765,259 A * | 10/1973 | Firth ..................... B23Q 16/00 408/133 |
| 3,874,658 A * | 4/1975 | Flowers ............. A63B 21/4029 482/104 |
| 4,055,329 A | 10/1977 | Hammond |
| 4,103,462 A | 8/1978 | Freller |
| 4,133,571 A | 1/1979 | Fillios |
| 4,148,461 A | 4/1979 | Orth |
| 4,509,724 A | 4/1985 | Okada |
| 4,715,480 A | 12/1987 | Anderson |
| 4,720,082 A | 1/1988 | Yang |
| 5,054,579 A | 10/1991 | Smillie, III et al. |
| 5,090,749 A | 2/1992 | Lee |
| 5,154,469 A | 10/1992 | Morrow |

(Continued)

*Primary Examiner* — Kiran B Patel

(74) *Attorney, Agent, or Firm* — Vorys, Sater, Seymour and Pease LLP

(57) ABSTRACT

A slidable room assembly comprising a vehicle body having an opening formed in an exterior wall and a reciprocable slideout unit or compartment disposed in the opening and slidable between a retracted position and an extended position. Sliding movement of the slideout unit is controlled by means of a drive mechanism that includes rack gear assemblies driven from a drive shaft as described herein. Sliding movement of the slideout unit may be either motor driven or manually powered.

2 Claims, 31 Drawing Sheets

(56) References Cited

U.S. PATENT DOCUMENTS

| | | | |
|---|---|---|---|
| 5,237,782 A | 8/1993 | Cooper | |
| 5,248,180 A | 9/1993 | Hussaini | |
| 5,295,430 A | 3/1994 | Dewald, Jr. et al. | |
| 5,332,276 A | 7/1994 | Blodgett, Jr. | |
| 5,634,683 A * | 6/1997 | Young | B60P 3/34 296/165 |
| 5,758,918 A * | 6/1998 | Schneider | B62D 33/08 296/171 |
| 5,800,002 A | 9/1998 | Tiedge et al. | |
| 5,833,296 A * | 11/1998 | Schneider | B60P 33/08 296/175 |
| 6,234,566 B1 * | 5/2001 | Cyr | B60P 3/34 296/165 |
| 6,266,931 B1 * | 7/2001 | Erickson | B60P 3/34 296/165 |
| 6,415,675 B1 | 7/2002 | Schneider et al. | |
| 6,976,721 B2 | 12/2005 | Rasmussen | |
| 7,052,064 B2 * | 5/2006 | Rasmussen | B60P 3/34 296/165 |
| 7,052,065 B2 * | 5/2006 | Rasmussen | B60P 3/34 296/165 |
| 7,540,546 B2 | 6/2009 | Kern et al. | |
| 7,588,279 B2 | 9/2009 | Rasmussen | |
| 7,614,675 B2 * | 11/2009 | Kunz | B60P 3/34 296/26.01 |
| 8,016,343 B2 | 9/2011 | Schwindaman et al. | |
| 8,042,853 B2 * | 10/2011 | Garceau | B60P 3/34 296/26.13 |
| 9,050,923 B1 | 6/2015 | Garceau et al. | |
| 2002/0153745 A1 | 10/2002 | Messano | |
| 2005/0179278 A1 * | 8/2005 | Yoder | B60P 3/34 296/26.13 |
| 2005/0230989 A1 * | 10/2005 | Nebel | B60P 3/34 296/26.01 |
| 2006/0082178 A1 | 4/2006 | Rasmussen | |
| 2006/0113822 A1 | 6/2006 | Kunz | |
| 2011/0025091 A1 * | 2/2011 | Schwindaman | B60P 3/34 296/171 |
| 2011/0156430 A1 * | 6/2011 | Gardner | B60P 3/34 296/26.13 |
| 2013/0119694 A1 * | 5/2013 | Garceau | B60P 3/34 296/26.13 |
| 2013/0119700 A1 * | 5/2013 | Garceau | B60P 3/34 296/175 |

* cited by examiner

SLIDABLE ROOM ASSEMBLY

CROSS-REFERENCE TO RELATED APPLICATIONS

This application is a Continuation of U.S. patent application Ser. No. 14/209,702, filed Mar. 13, 2014, and claims priority to and the benefit of U.S. Provisional Application No. 61/783,449, filed Mar. 14, 2013, the disclosures of both of which are incorporated herein in their entirety by reference.

TECHNICAL FIELD

This invention relates to a slidable room assembly, particularly to a slidable room assembly for a vehicle having a slideout room or compartment that is retracted when the vehicle is in motion and may be extended to afford more room when the vehicle is parked. More particularly, this invention relates to a slidable room assembly that includes an improved mechanism for reciprocation of the slideout unit relative to the vehicle.

BACKGROUND OF THE INVENTION

Recreational vehicles, including motor homes, fifth wheel trailers and travel trailers may be provided with an extendable slideout unit for increasing the vehicle's living space. This slideout unit may be extended for use when the vehicle is parked and is retracted in a telescoping manner when the vehicle is to be moved.

Prior vehicle slideout installations that include an extension/retraction system that relies on screws or a pinion for effecting telescoping movement of the slideout unit relative to the vehicle are known. Screws, in particular, must be short for practical reasons, including the tendency of a longer screw to deflect so that the axis of the screw is not absolutely straight. This, of course, greatly impairs operability of the screw. Pinions must also be comparatively short for practical reasons, including excessive weight in a pinion of greater length. Since the amplitude of movement of the slideout room or compartment can be no greater than the length of the screw or pinion, the amplitude of sliding movement, and hence the amount of additional space gained by the slideout compartment, is limited.

Other types of slideout installations for vehicles are also known. One such installation employs an endless cable that passes over one pair of pulleys supported by a main part of a mobile home and a second pair of pulleys mounted on side walls of an extension part of the mobile home to cause the extension part to reciprocate. Another slideout installation shows an expanding caravan, which also includes a rotatable shaft and two types of cables wound therearound. Rotation of the shaft in one direction causes one type of cable to wind as the other type unwinds, causing a sliding unit a second module to reciprocate in one direction (say outwardly) relative to first module. Rotation of the shaft in the opposite direction causes the second module to move in the opposite direction (say inwardly relative to the first module).

A challenge with slideable room assemblies is that a slideout room is cantilevered as it is extended. The outer end of the extended slideout room tends to tip downwardly. This puts weight on the slideout unit's operating mechanism. The cantilevered slideout room also tends to be loose at the top and tight at the bottom. This puts weight on the slideout mechanism, which in turn impairs slideability and also invites leakage.

Another challenge with presently known slideout units is that they require modification of the vehicle's underframe, unless the slideout unit is of small size. For example, it may sometimes be necessary to cut away a portion of the underframe in order to accommodate the operating mechanism of the slideout unit. This impairs the ability of the underframe to support the vehicle by lessening the strength and rigidity of the underframe.

SUMMARY OF THE INVENTION

An embodiment of the present invention provides a vehicle slideout assembly that can be moved between retracted and extended positions with a single motor from any of multiple positions in the slideout assembly. Additional motors may be added, as needed, to handle additional load capacity.

An embodiment of this invention provides a series of bevel gear configurations at the corners of the slideout assembly to enable even movement of the assembly at each corner.

According to this invention, a vehicle is provided with one or more horizontally reciprocable slideout units. Slideout units according to this invention can include one or more room slideout units and/or one or more storage slideout units (or compartments). A vehicle may have either type or both types of slideout units, and may have one or more slideout units of each type.

The vehicle (motor homes, fifth wheel trailers or travel trailers) comprises a vehicle body having a plurality of exterior walls, at least one of which has an opening therein. Each slideout unit is disposed in the vehicle body opening and is slidable between an extended position and a retracted position. The vehicle body and a slideout unit form respective first and second relatively reciprocable modules. The drive mechanism is supported by one of the modules and comprises at least one drive mechanism powering a drive shaft, a plurality of bevel gears located at corners of the slideable room assembly, and at least one rack/gear assembly for moving the slideable room assembly between extended and retracted positions.

In another embodiment of this invention, a slideout assembly of the type having a body with a plurality of exterior walls, at least one of which has an opening and a slideout unit disposed in the opening and reciprocable between an extended position and a retracted position, wherein the improvement comprises:

BRIEF DESCRIPTION OF THE DRAWINGS

This invention will now be described with particular reference to the accompanying drawings, in which.

DESCRIPTION OF THE PREFERRED EMBODIMENTS

Figure 1:
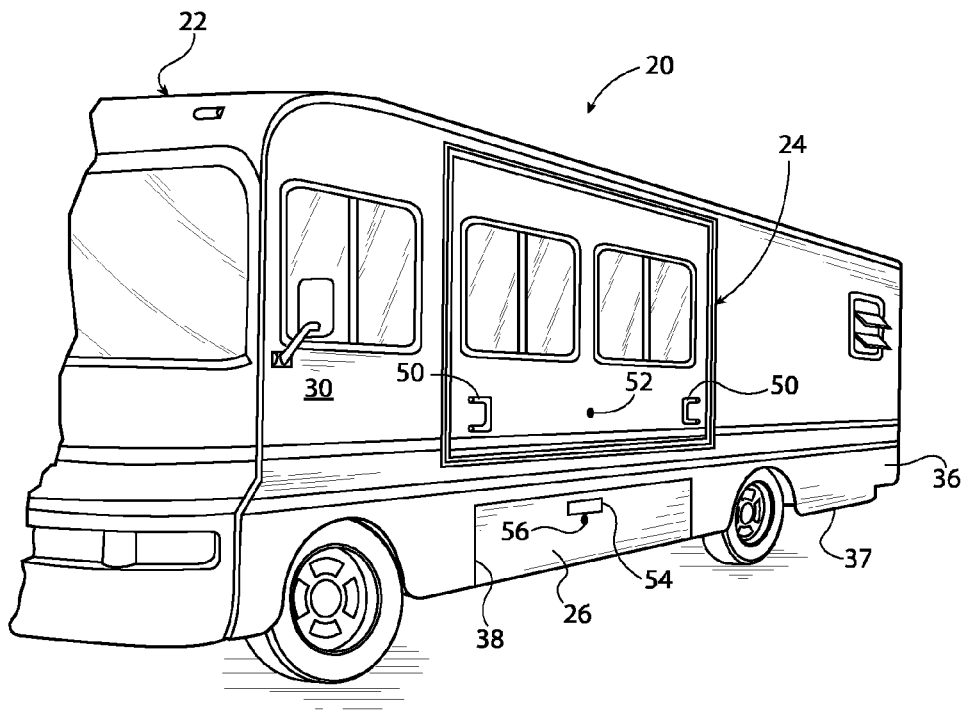
FIG. 1 is a partial perspective view of a recreational vehicle incorporating slideout units in accordance with the present invention, illustrating the slideout units in the retracted position.
Figure 2:
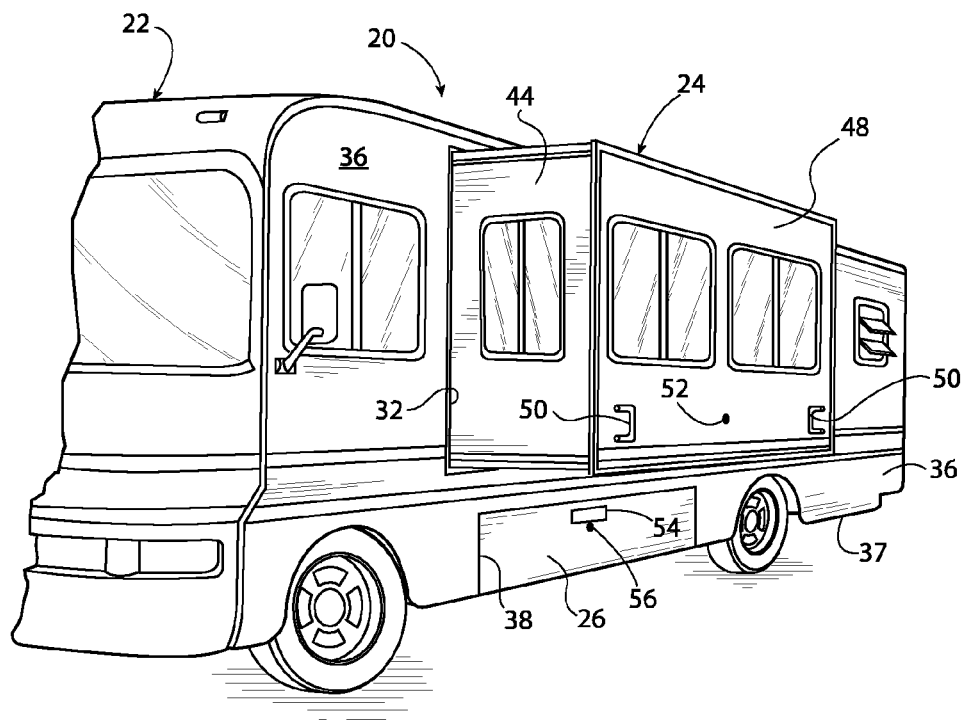
FIG. 2 is a perspective view of a recreational vehicle incorporating slideout units in accordance with the present invention, illustrating a slideout unit that forms a room extension in the extended position.
Figure 3:
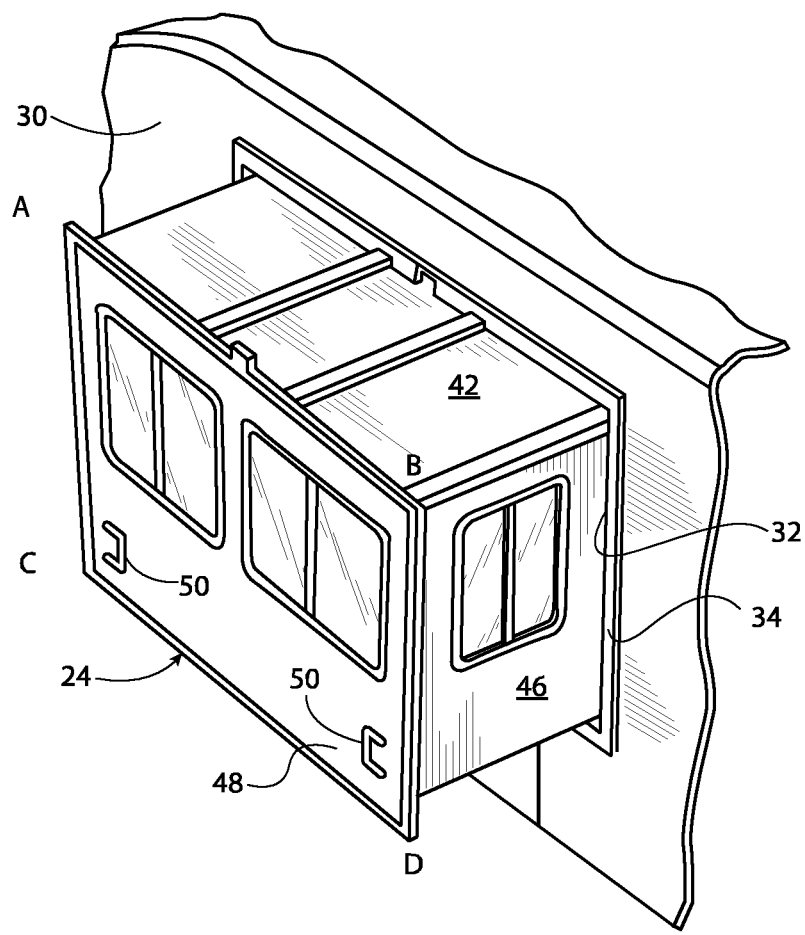
FIG. 3 is an isolated perspective view of a recreational vehicle's slideout unit in accordance with the present invention, illustrating a slideout unit that forms a room extension in the extended position.

Referring now to FIGS. 1 through 3, the present invention in one embodiment relates to a vehicle 20 comprising a vehicle body 22 (or base unit or first module) having one or more room slideout units (or second modules) 24 that is horizontally reciprocable relative to the vehicle body 22 between a retracted (or first) position shown in FIG. 1 and an extended (or second) position shown in FIGS. 2 and 3. The vehicle 20 can be a motor home, a fifth wheel trailer or a travel trailer. The slideout unit 24, when extended, affords more room or space to the interior of the vehicle. A novel actuation system or drive mechanism (or force transmitting mechanism) to be described later is provided for reciprocation of the slideout unit 24. This first slideout unit (room slideout unit or space-expanding slideout unit) 24 and the drive mechanism for reciprocating the slideout unit 24 together form a slidable room assembly.

The vehicle 20 may alternatively or further comprise one or more reciprocable storage slideout units 26, which may serve as storage compartments. This second or storage slideout unit 26, shown in closed (or retracted) position in FIGS. 1 and 2, is shown as disposed in a lower portion of a side wall of vehicle body 22. The actuating system or drive mechanism for reciprocating the storage slideout unit 26 may be similar to that used to reciprocate room slideout unit 24, but may be smaller and less powerful (since a storage slideout unit 26 is commonly much lighter than a room slideout unit 24) and may be positioned differently.

A vehicle 20 may have either any number of room slideout units 24, or storage slideout units 26, or both. Thus, a vehicle 20 may have storage slideout units 26 but no room slideout unit 24 if desired. Also, a vehicle may have either slideout units 24 but no storage slideout unit 26 if desired.

The vehicle 20 may be a self-powered vehicle, such as a recreational vehicle, or may be a trailer that is adapted to be towed, e.g. by an automobile or a truck. The vehicle may be one that is designed for living (as a house trailer) or may be a work vehicle (e.g. a mobile library).

In any case, a vehicle 20 according to this invention comprises a vehicle body 22 having a plurality of exterior walls, e.g., a roof, a front wall, side walls, and a rear wall. The interior of vehicle body 22 also has a floor. Beneath the floor is an underframe (not shown) for supporting the vehicle body 22; the underframe may be conventional. At least one of the exterior walls, here shown as the left side wall 30, has an opening 32 therein for receiving the first reciprocable slideout unit 24. The opening 32 in the left side 30 of vehicle body 22 is preferably rectangular, as shown, and has a perimeter that includes horizontal top and bottom edges and vertical side edges. Each of the side walls 30 (only the left side wall is shown) may have a lower portion or skirt 36, which is disposed below the floor of vehicle 20 and which terminates in a lower edge 37. One or both side walls 30 may have an opening 38, which is preferably rectangular, for receiving a storage slideout 26. There may be any number of such openings 38 equal to the number of storage slideout units 26. These openings 38 may be in any location. Opening 38 preferably extends to the lower edge 37 of the side wall 30.

Both slideout units 24 and 26 should always be retracted, as shown in FIG. 1, when the vehicle is in motion. When the vehicle is parked or stationary, the room slideout unit 24 may be slid to the extended position shown in FIGS. 2 and 3, to afford additional room in the interior of the vehicle. Similarly the storage slideout unit 26 may be opened (i.e., moved to extended position) when the vehicle is at rest.

The room slideout unit 24 generally has the same cross-sectional shape as the opening 32 in the vehicle body 22, i.e., rectangular in the embodiment shown. The slide out unit 24 may comprise a floor 40, a ceiling 42, left and right side walls 44 and 46, respectively (as seen from the exterior of vehicle 20 looking in), and a forward or outside wall 48. For convenience and further reference only, slideout unit corners are referenced using letters A, B, C, and D, as further shown in FIGS. 3 and 4. The forward or outside wall 48 of the slideout unit 24 is substantially coincident with (and spaced slightly outwardly from) the left side wall 30 of the vehicle body 22 when the slideout unit 24 is retracted (FIG. 1), and is parallel to and spaced outwardly from the vehicle body side wall 30 when the slideout unit 24 is extended (FIG. 2). As described, the right side wall 46 of the slideout unit 24 is disposed in a rearward direction of the vehicle body 22, and the left side wall 44 of the slideout unit 24 is disposed in a forward direction of the vehicle body. The spacing between opposite side walls 44 and 46 is just slightly less than the width of the opening 32 in the vehicle body 22, to afford enough clearance for sliding movement of the slideout unit 24 while minimizing the intrusion of the elements such as wind and rain. The size of the forward or outer wall 48 can be just slightly greater than the size of the vehicle body opening 32. In this manner, the edges of the forward wall 48 overlie the vehicle body 22 as an aid in maintaining a good seal when the slideout unit is retracted. Seals (not shown) extending around the perimeter of opening 22 may be provided.

The room slideout unit 24 may be provided with windows in the forward and side walls, as shown, particularly when the vehicle is used as a recreational vehicle or house trailer.

Opening and closing movements of either the first or second slideout units or compartments 24 and 26 can be accomplished with a power assist, as will be described later. In certain embodiments (i.e., when manual operation or servicing is desired), handles 50 may be provided on the front wall of the slideout unit 24, so that the slideout unit can be opened and closed manually. A lock 52 for room slideout unit 24 may be provided. Such lock may be provided in addition to the functioning of the drive mechanism that locks the slideout unit 24 in position when it is at rest (whether retracted, extended or in between). Similarly, the storage slideout unit 26 may be provided with a handle 54 for manual operation and a lock 56.

One or more than one space-expanding slideout unit 24 may be provided in a vehicle 20 in accordance with this invention. A horizontally reciprocable room slideout unit 24 may be provided in any of the exterior walls of vehicle 20, e.g. the left side wall 30 as shown, the right side wall, and/or the rear wall of vehicle 20. Also in accordance with this invention, one may provide a vertically reciprocable slideout unit in order to expand interior space in a vertical direction. The drive mechanism in all cases may be as described in the figures.

In all embodiments, force is transmitted evenly to upper and lower portions and to both sides of the slideout unit, resulting in smooth, even application of force, so that the slideout unit reciprocates smoothly along its predetermined axis and in a predetermined plane with no tendency to twist or bind, and with minimum power input required, considering the appreciable weight of a typical slideout unit for a vehicle.

The force transmission systems (or drive mechanisms) illustrated herein are shown as on-board systems, which are shown as mounted on the slideout unit 24. By mounting the entire drive mechanism on the slideout unit 24, and not on fixed frame 34 or any other member that is part of the vehicle body 22, one can manufacture the slideout unit 24 and its drive mechanism as a modular unit and ship the modular unit to another site for assembly with or installation in a vehicle body 22 having a slideout opening 32 of the required size. However, drive mechanisms provided independent of the slideout unit and requires connection to the slideout unit upon installation are contemplated. Drive mechanism 73 is shown as attached to a bottom frame member via motor bracket 76. Drive mechanisms which are either a self-locking worm drive or a planetary gear motor with an electric brake are two types qualified for use with this invention. As will be explained in more detail later herein, drive mechanism can be operatively installed at any position around the slideout frame 60. This can be desirable to mask the drive mechanism from view, depending on the exact configuration of the vehicle and/or slideout unit. Chain 71 or direct drive units are appropriate for use herewith.

Figure 4:
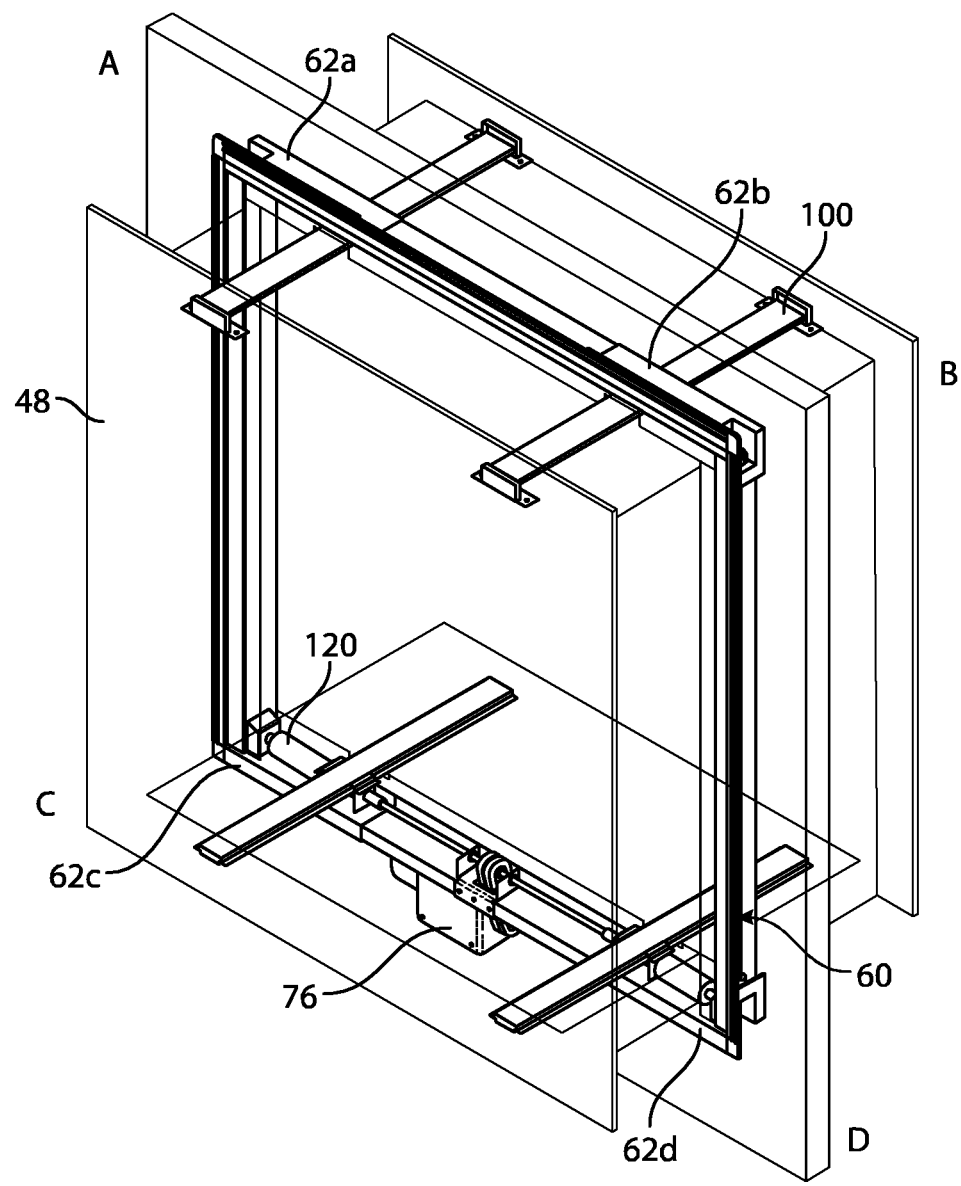
FIG. 4 is a perspective view of a slideable room assembly in accordance with the present invention as viewed from the upper exterior of a recreational vehicle; wherein a slideable room assembly unit forming a room extension is illustrated in a partially extended position.
Figure 5:
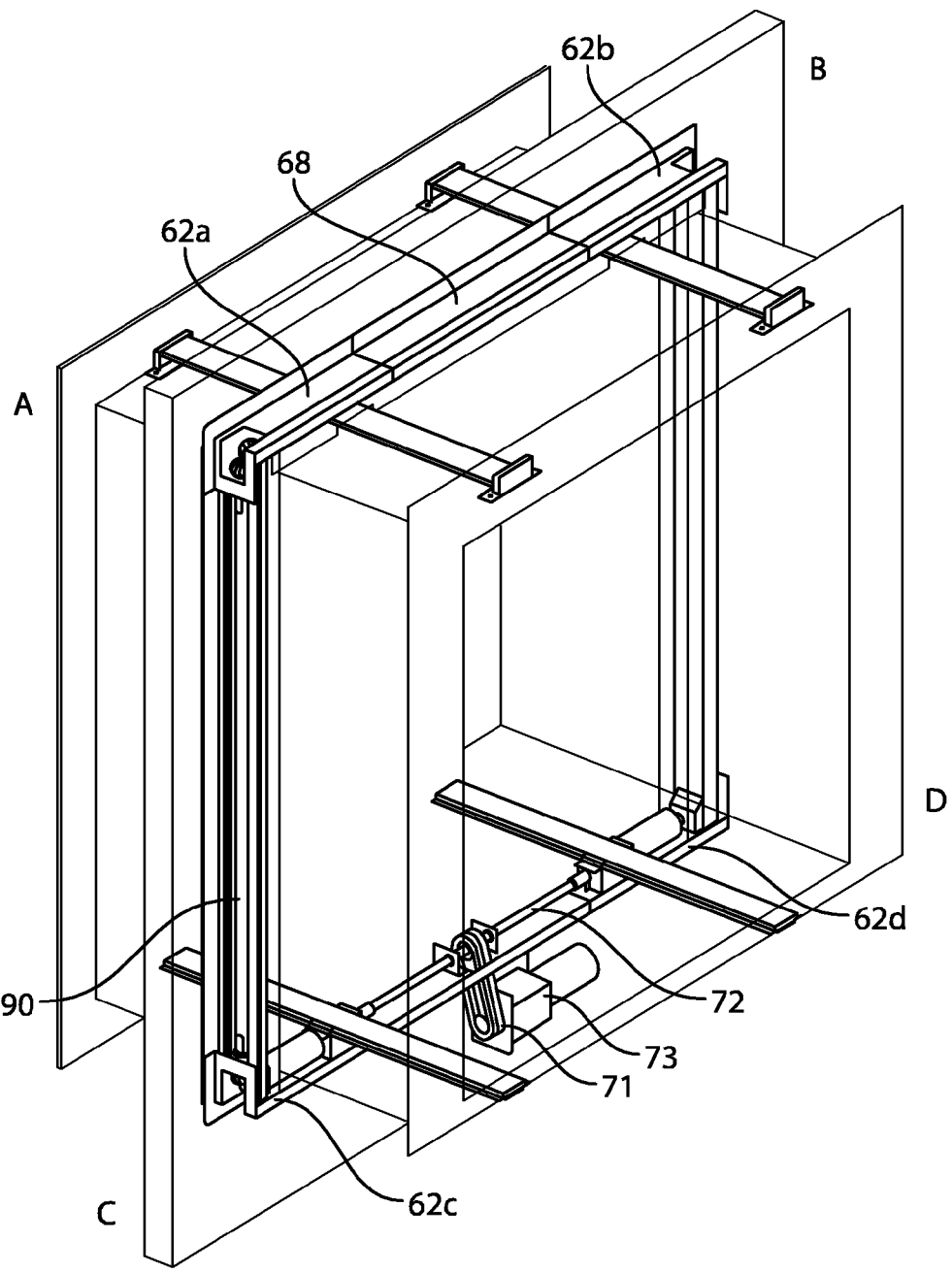
FIG. 5 is a perspective view of a slidable room assembly according to a first embodiment of this invention as viewed from the upper interior of a recreational vehicle wherein a slideable room assembly unit forming a room extension is illustrated in a partially extended position.
Figure 6:
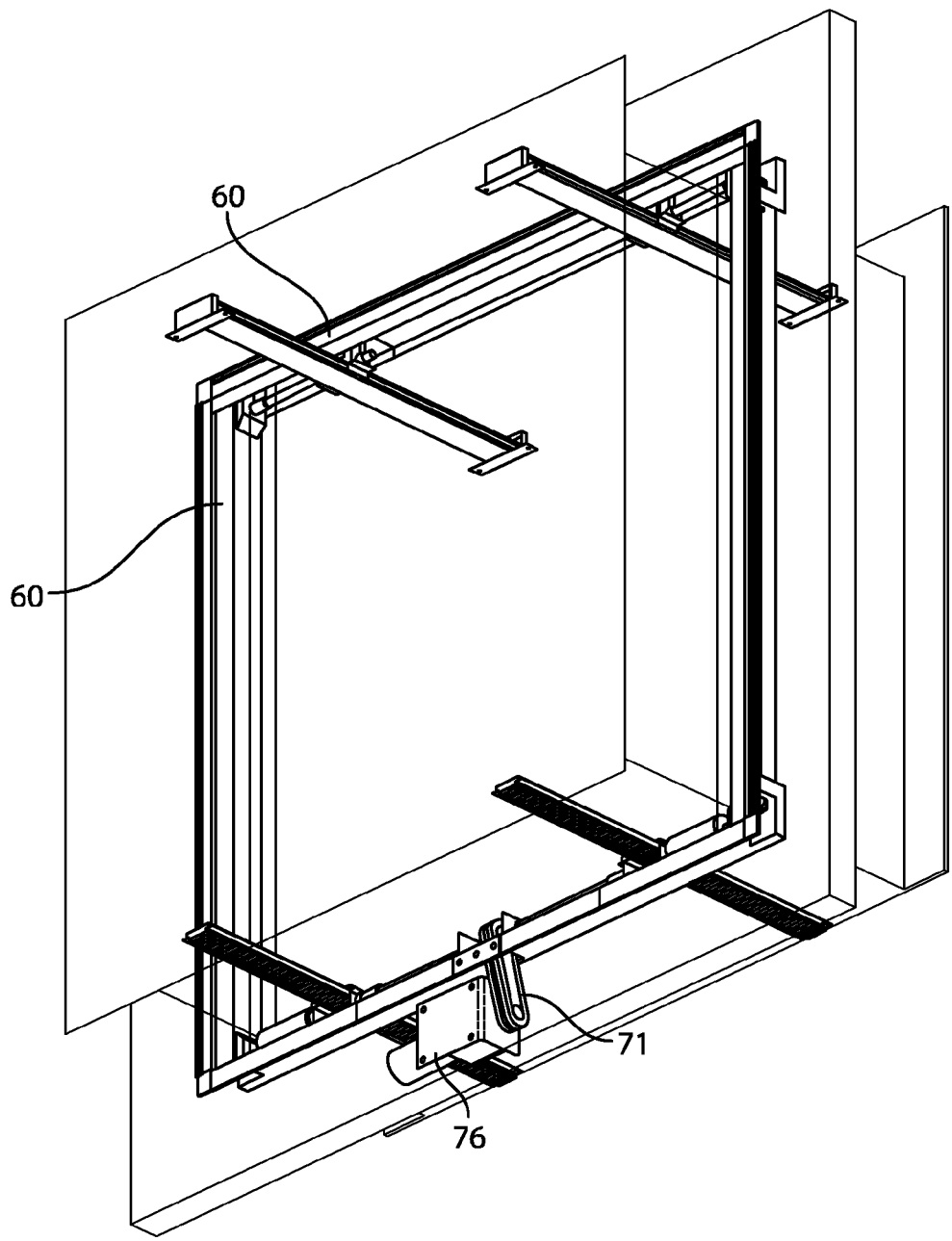
FIG. 6 is a perspective view of a slidable room assembly according to a first embodiment of this invention as viewed from the lower exterior of a recreational vehicle wherein a slideable room assembly unit forming a room extension is illustrated in a partially extended position.
Figure 7:
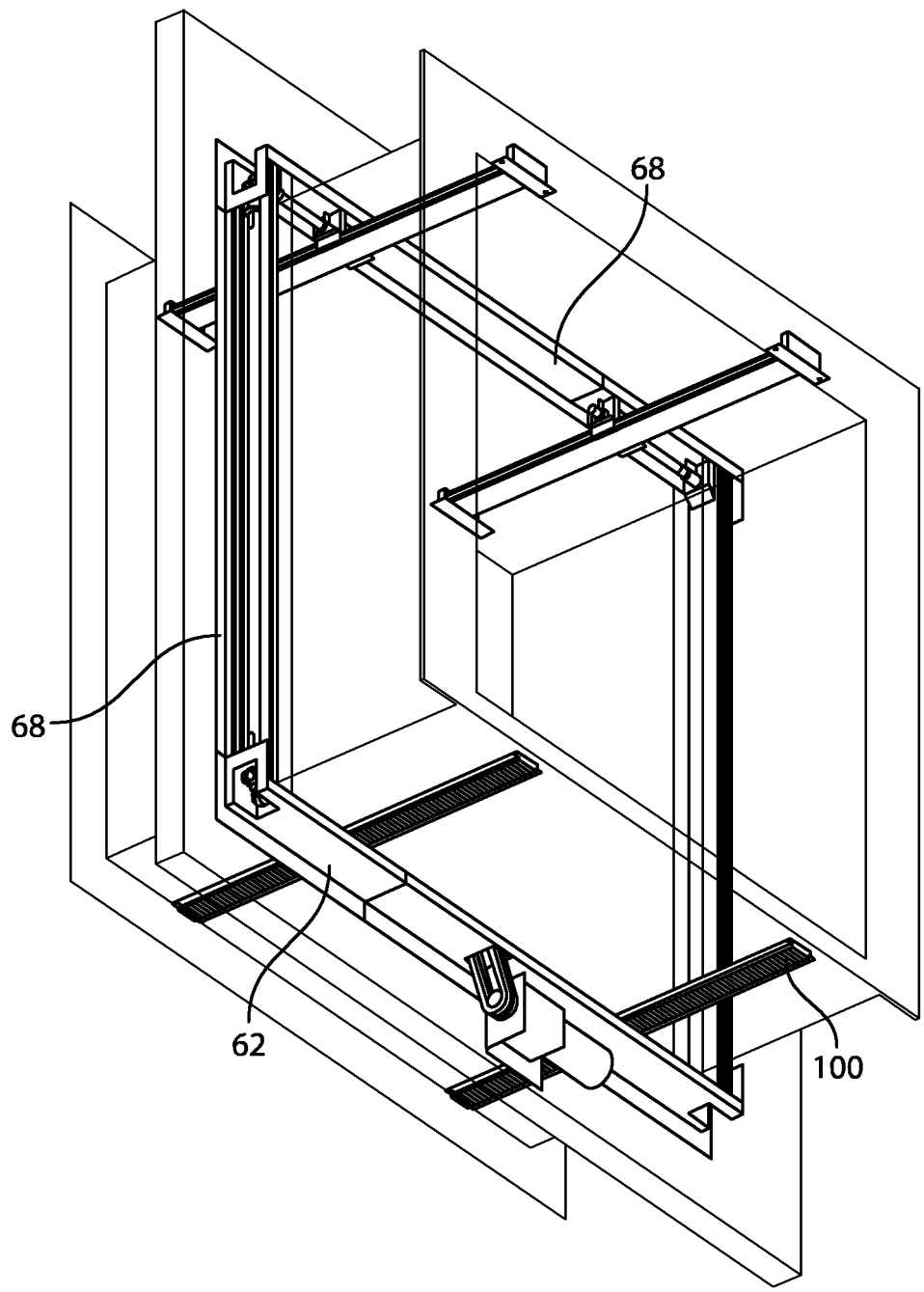
FIG. 7 is a perspective view of a slidable room assembly according to a first embodiment of this invention as viewed from the lower interior of a recreational vehicle wherein a slidable room assembly unit forming a room extension is illustrated in a partially extended position.
Figure 8:
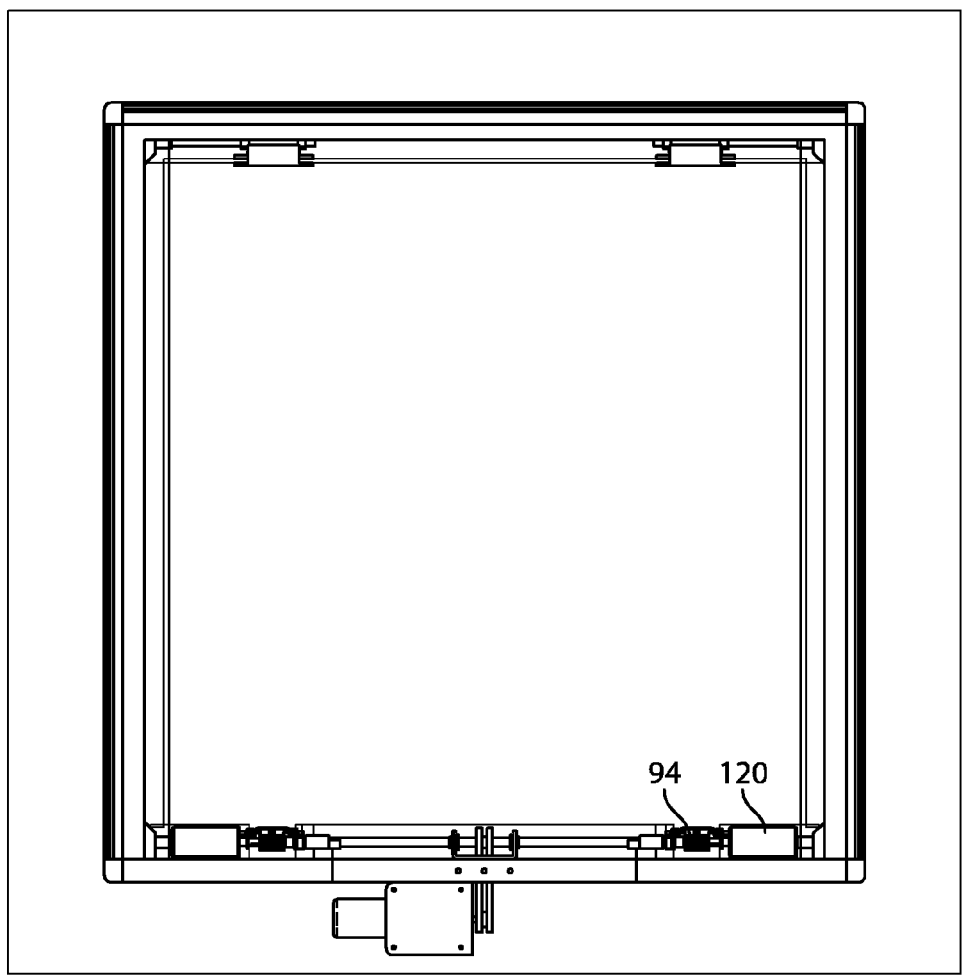
FIG. 8 is an elevational front view of a slidable room assembly according to a first embodiment of this invention as viewed from the exterior of a recreational vehicle.

Referring now to FIGS. 4 and 5, a slideout unit frame 60 is shown as having four (4) corner members 62*a-d* connected by mid-frame members 68. Slideout unit frame 60 is attached at the periphery of the opening in said vehicle body. Corner members 62*a-d* must be of sufficient strength to support the slideout unit and the drive mechanism components contained therein and attached thereon. In one embodiment corner members are cast out of metal, including aluminum, but are also contemplated as being made of component parts attached by conventional means such as welding or bolting onto a bracket body. For ease of manufacturing, opposing corner members when cast, can be of a single casting. In other words cast corner members for corners A and D can be of one casting configuration, and corner members B and C of another casting configuration. Mid-frame members 68 may be made of a metal or plastic material or any material which substantially maintains its shape. Aluminum, due to its light weight and structural strength is one qualified material. Mid-frame members 68 serve to protect the drive shaft and auxiliary shafts, but one or more such members may be omitted if desired.

A plurality of roller assemblies 120 (see at least FIGS. 4, 5, 6, and 8) may be provided for smooth reciprocation of slideout unit 24 relative to vehicle body 22. These roller assemblies 120 may include one or more rollers which engage the underside of slideout unit floor 40 and which are freely rotatably mounted in a mounting bracket affixed to a corner member 62*a-d* or mid-frame member 68. If desired, the mounting of roller assemblies 120 can be rotatably mounted in mounting brackets on the vehicle and engage the floor of which body 22 in rolling relationship. In either case, the roller assemblies may be located close to side edges of slideout unit floor 40. The number, position, and size of roller assemblies may be varied without deviating from the intention of their purpose in the present invention. The roller assemblies 120 furnish sufficient support for the weight of the slideout unit 24.

Sprocket 70 is shown by example as located in a lower portion of slideout unit 24 just below the floor 40, as best seen at least in FIGS. 4 and 5. Sprocket 70 is mounted on a drive shaft 72 for rotation therewith. Drive shaft 72 extends along the length of one side of frame 60 of slideout unit 24.

Drive shaft 72 may be driven by an electric motor 73. Alternatively, a portable motor (which is connected to drive shaft 72 only when the slideout unit 24 is to be moved) or a hand crank (which may be connected to drive shaft 72), may be used instead of an electric motor 73. Whatever form of power input is used, it is advisable to lock the slideout unit in position when it is not in motion. When used, a worm drive performs a locking function when the slideout unit 24 is at rest, locking the slideout unit 24 in place (in closed position when fully retracted, for example), so that a separate lock is not necessary. With other drive mechanisms, locking means (e.g., a cam lock, or clamp in the walls of slideout unit 24) may be used to retain the slideout unit 24 in position. The rotating axis of drive shaft 72 is maintained by two or more bushings 74 located on corner members 62 or mid frame members 68. Drive shaft 72 terminates into and rotates a first gear of a bevel gear set 80 located at each corner of slideout frame 60 on either side of motor 73 and as shown in at least FIGS. 10-12, 15, 17, 20, 24 and 28).

Looking at FIGS. 5, 7, 10, and 11, first bevel gears 81 in corners C and D are driven by drive shaft 72. Second bevel gears 82 in corners C and D are rotatably engaged by the first bevel gear 81 in these corners, and redirects the rotational energy of the drive shaft 72. Second bevel gears 82 in corners C and D in turn rotate auxiliary shafts 90 (in this illustration auxiliary shafts run between corners C-A and D-B). Similarly, there are auxiliary or timing shaft(s) 90 operatively connected to spur or drive gears 94 capable of driving rack gear sets 100 along side A-B when connected to bevel gear sets 80 located in corners A and B, such that bevel gear 84 accepts rotation by bevel gear 83 connected to an auxiliary shaft 90. Such a configuration may exist as a single auxiliary shaft running between bevel gear sets 83/84 at corners A and B (not shown) or as separate shafts which terminate at spur gears 94 in the vicinity of corners A and B as apparent in at least FIG. 7 and FIGS. 17-27. Spur gears 94 located on drive shaft 72 similarly move rack gear sets 100 along a defined linear path.

Figure 9:
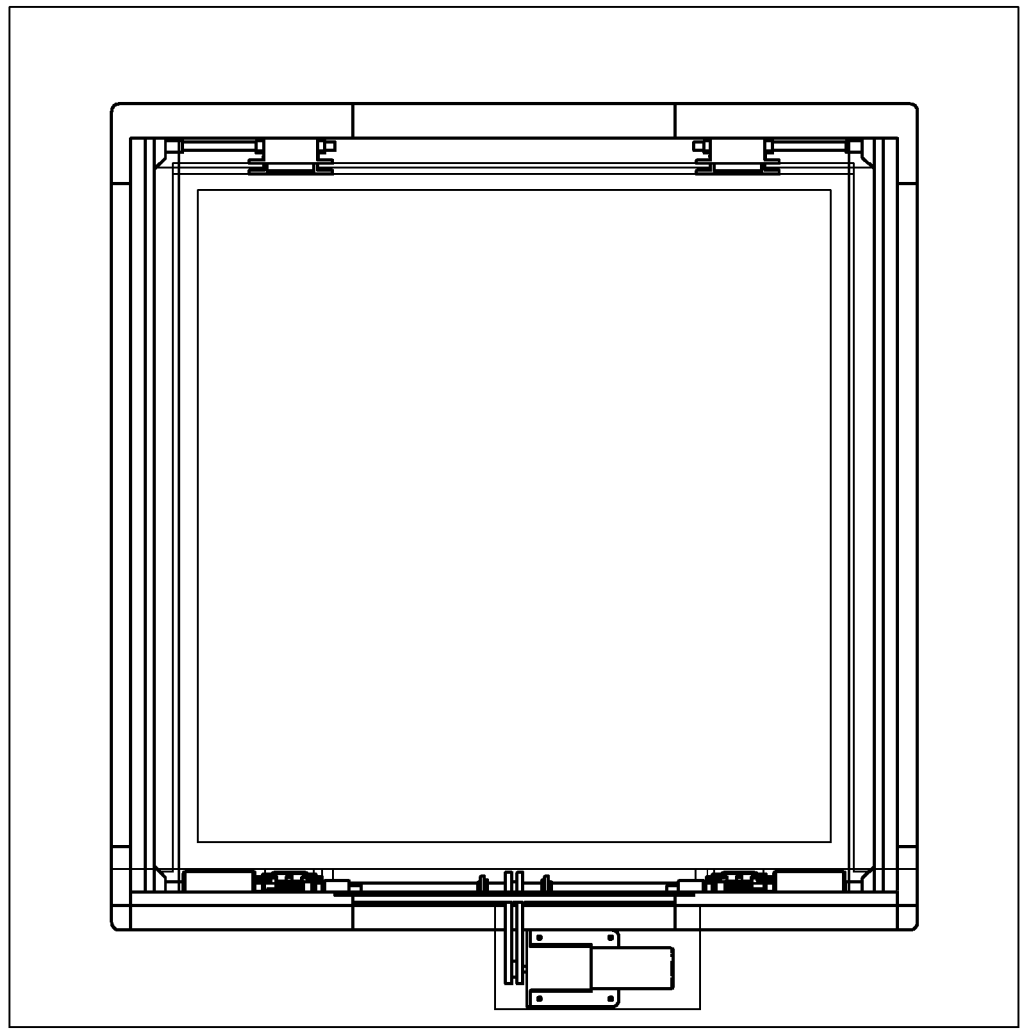
FIG. 9 is an elevational view of a slidable room assembly according to a first embodiment of this invention as viewed from the interior of a recreational vehicle.
Figure 10:
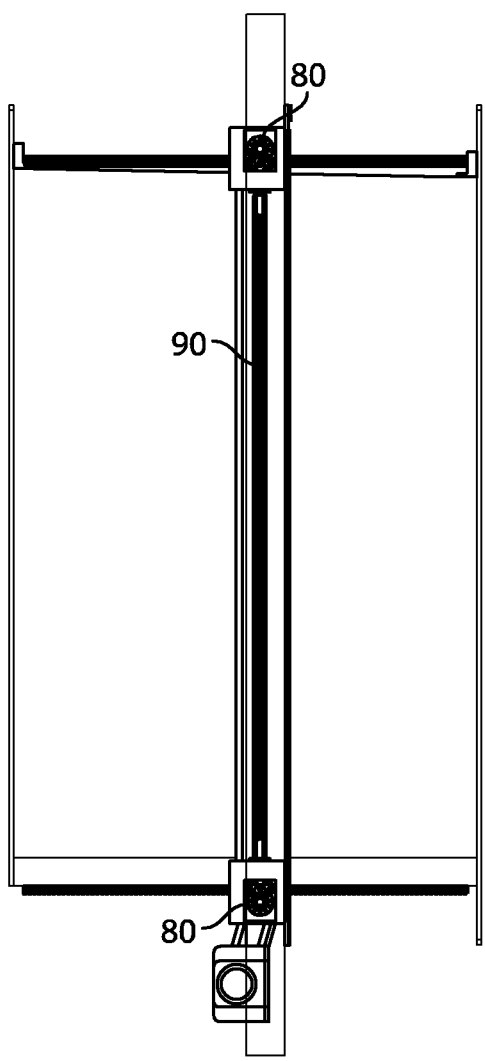
FIGS. 10 and 11 are elevational views of a slidable room assembly according to a first embodiment of this invention as viewed from opposing sides of the slidable room assembly.
Figure 11:
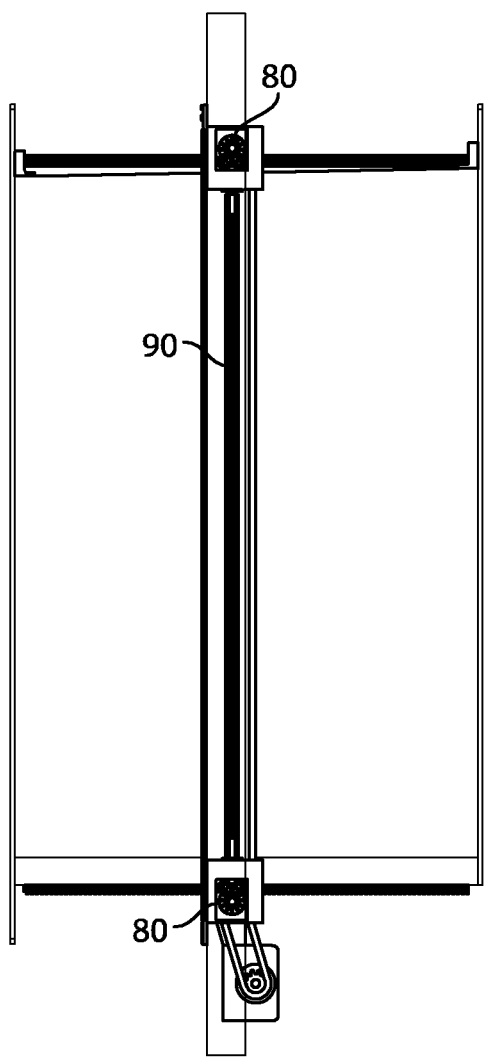
Figure 12:
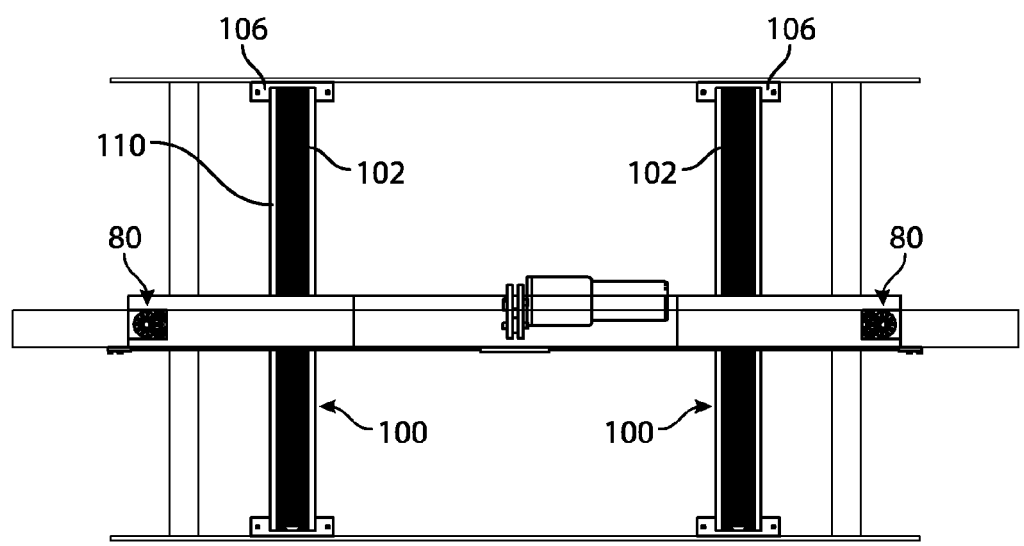
FIG. 12 is a bottom view of a slidable room assembly according to a first embodiment of this invention.
Figure 13:
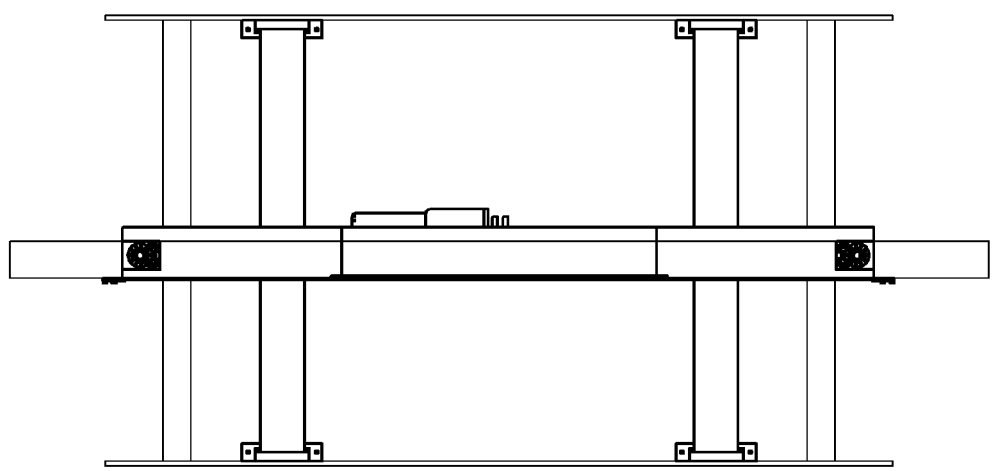
FIG. 13 is a top view of a slidable room assembly according to a first embodiment of this invention.
Figure 14:
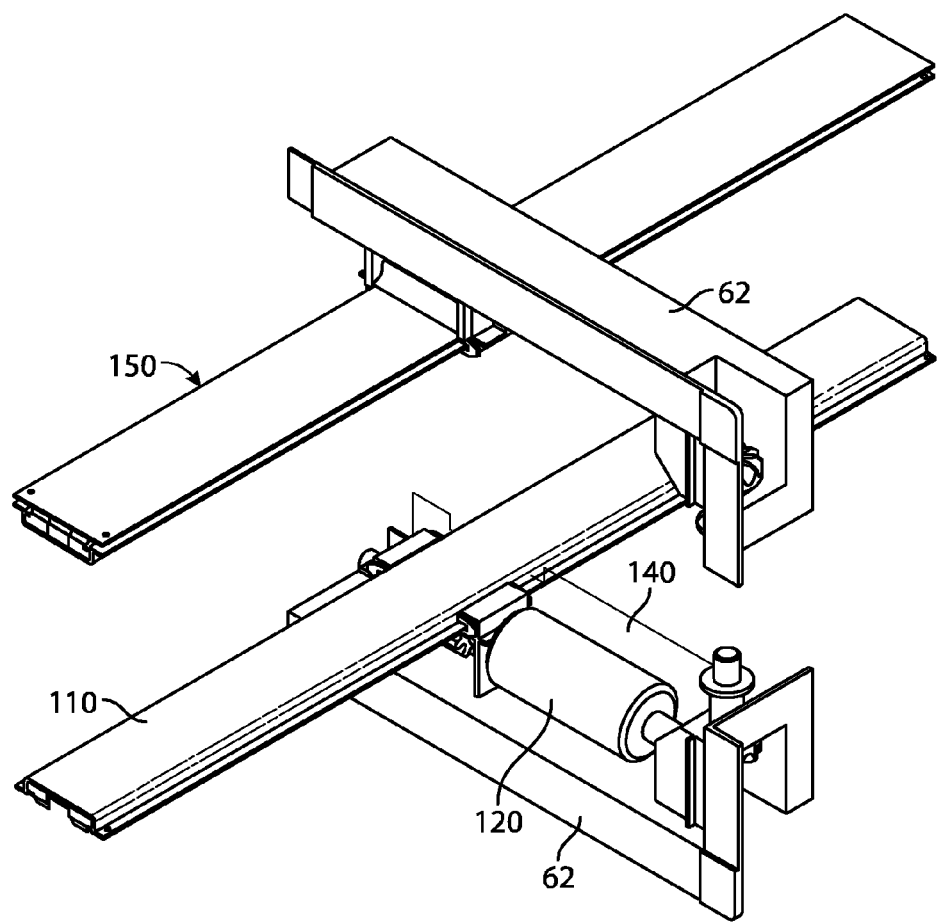
FIG. 14 is an upper exterior perspective view of top and bottom corner portions of a slideout unit in accordance with this invention.
Figure 15:
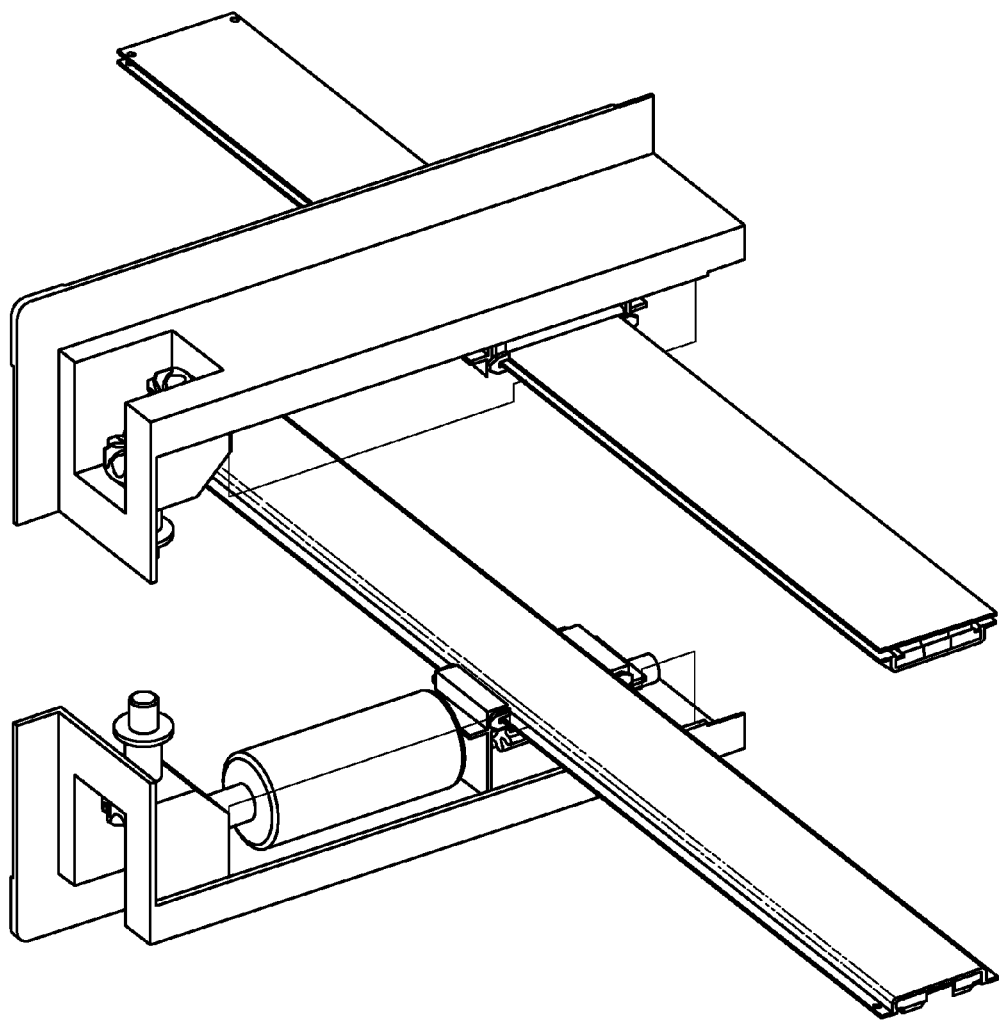
FIG. 15 is an interior perspective view of top and bottom corner portions of a slideout unit in accordance with this invention.
Figure 16:
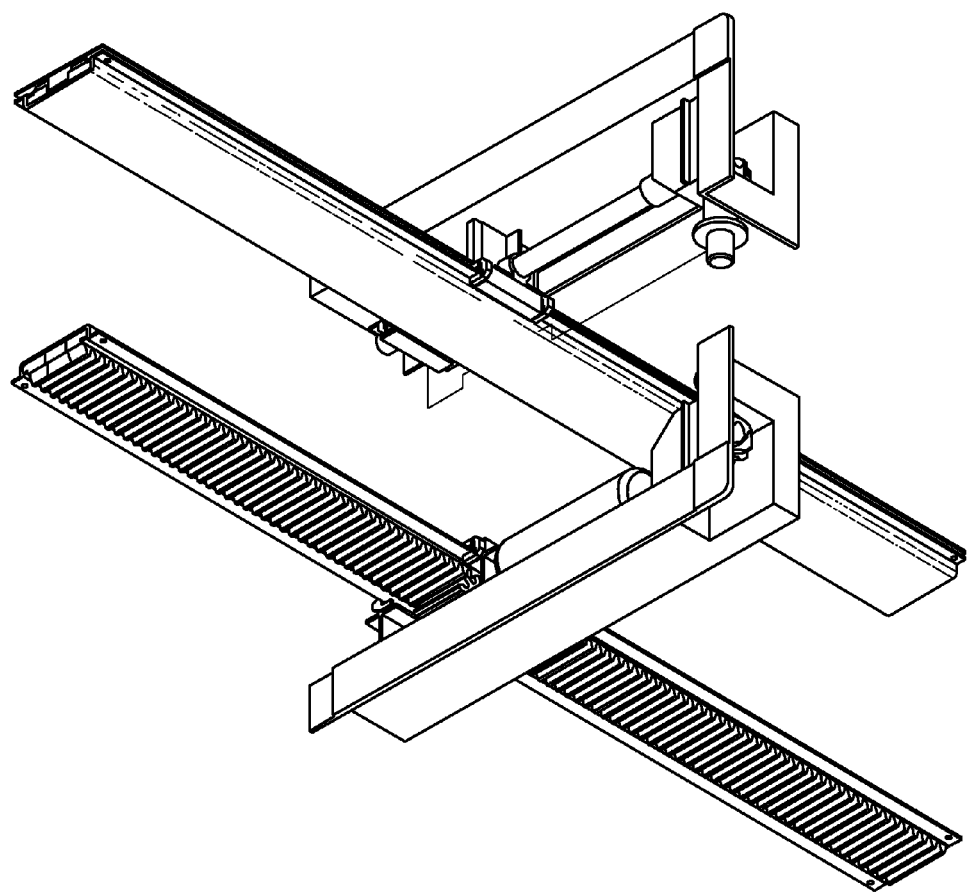
FIG. 16 is a lower exterior perspective view of top and bottom corner portions of a slideout unit in accordance with this invention.
Figure 17:
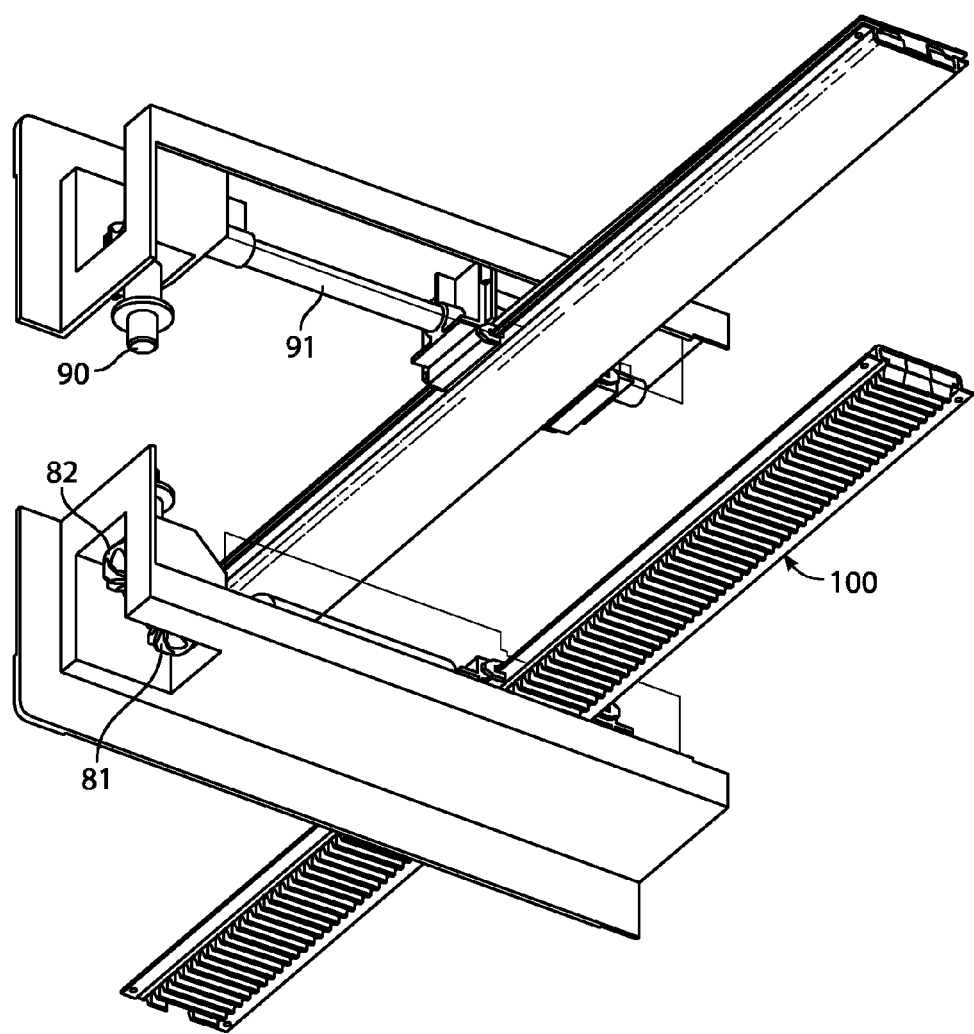
FIG. 17 is a lower interior perspective view of top and bottom corner portions of a slideout unit in accordance with this invention.
Figure 18:
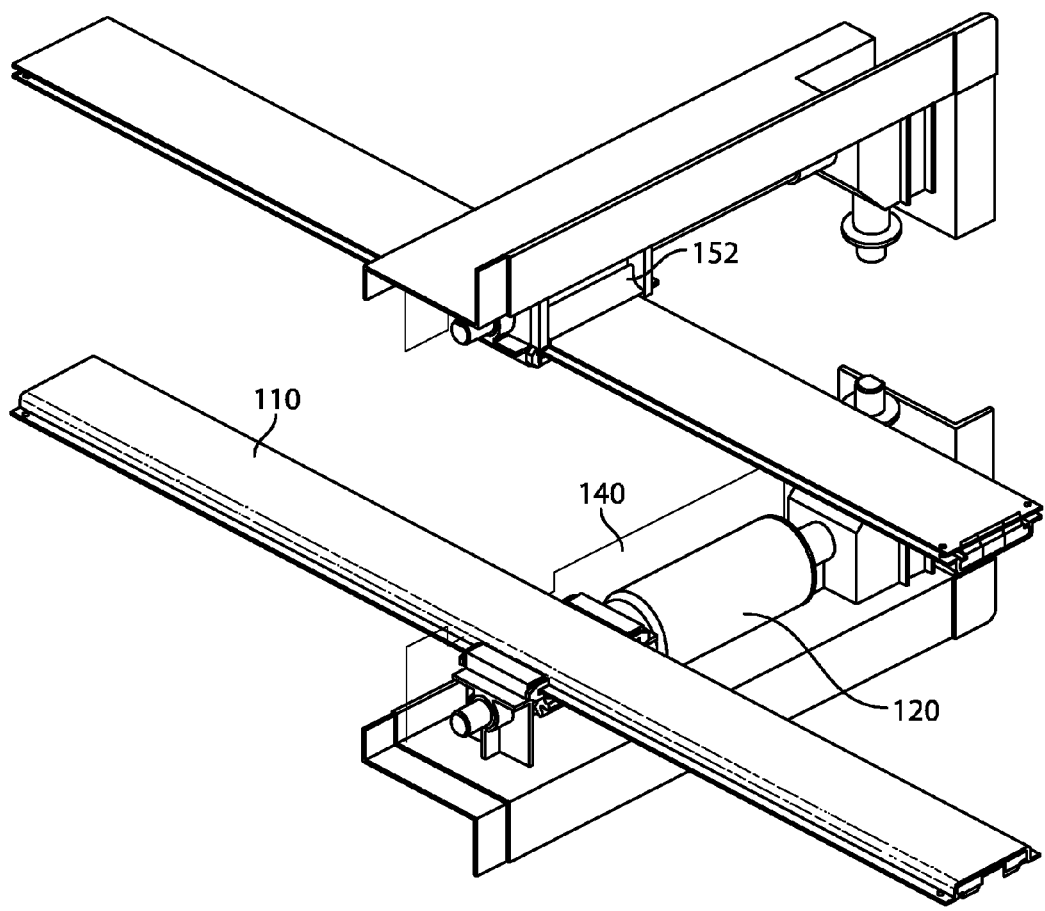
FIGS. 18, 19, 20, and 21 are further exterior perspective views of top and bottom corner portions of a slideout unit in accordance with this invention.
Figure 19:
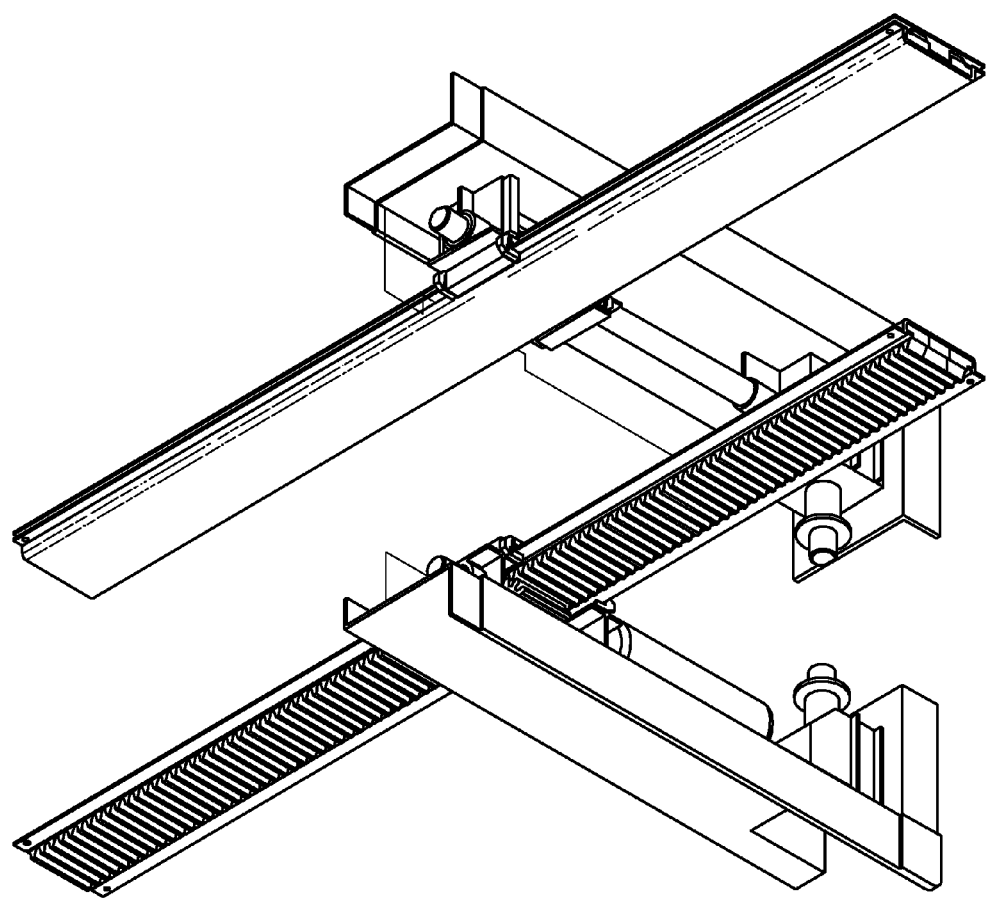
Figure 20:
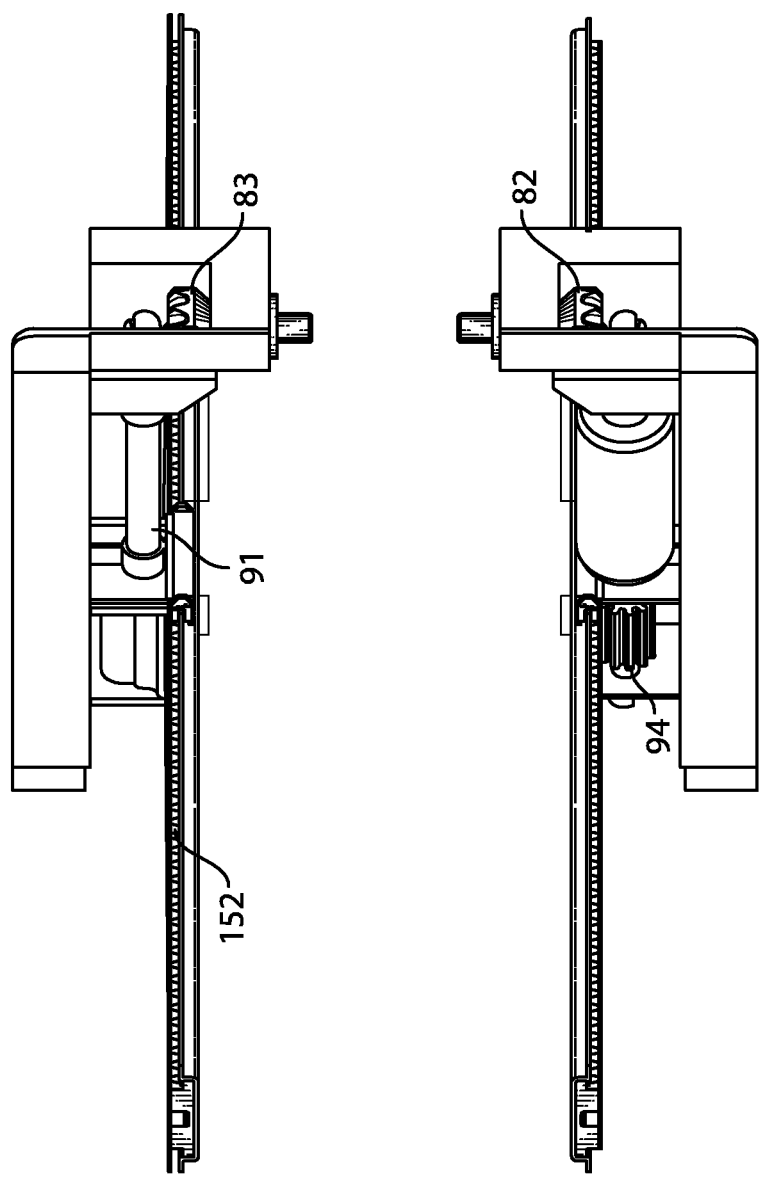
Figure 21:
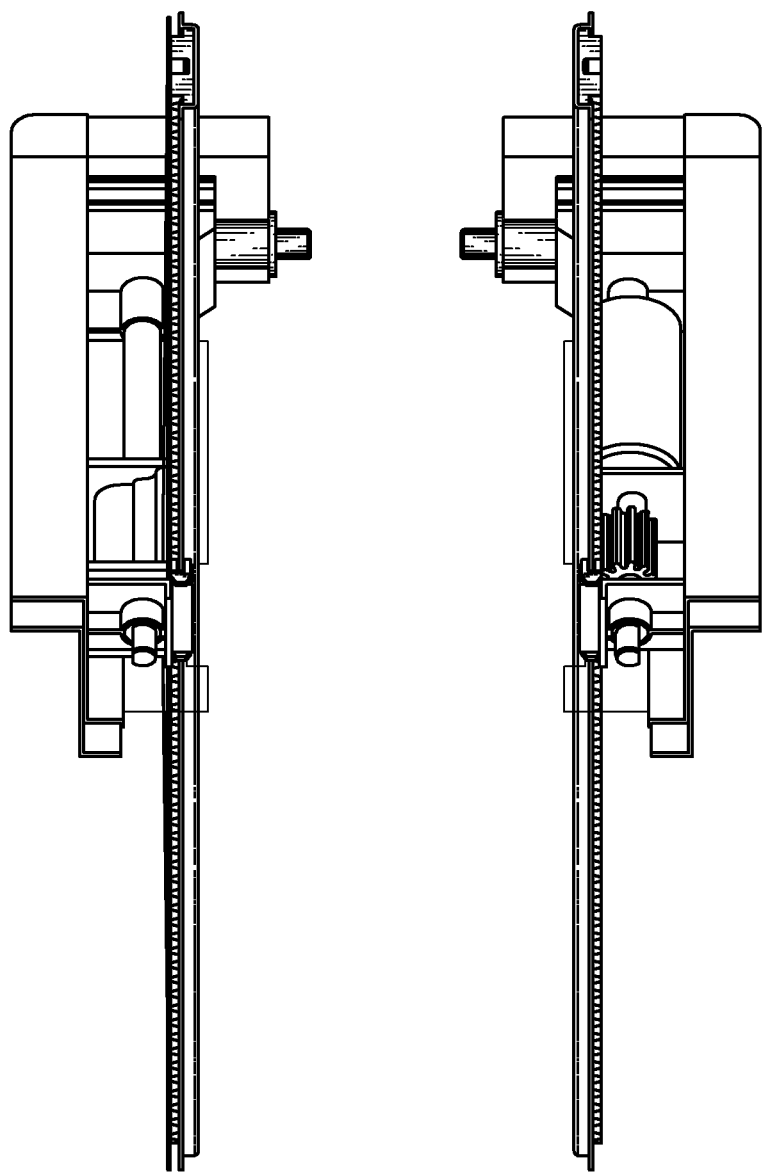
Figure 22:
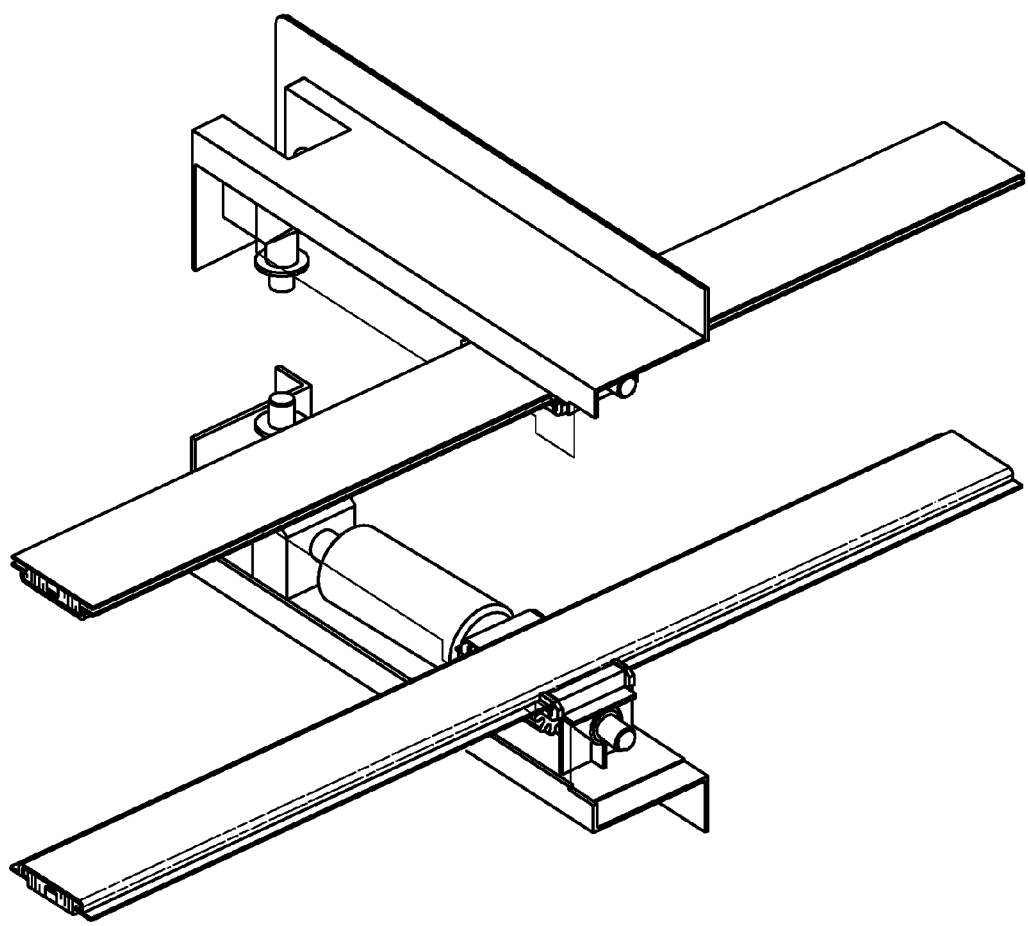
FIGS. 22, 23, 24, and 25 are further interior perspective views of top and bottom corner portions of a slideout unit in accordance with this invention.
Figure 23:
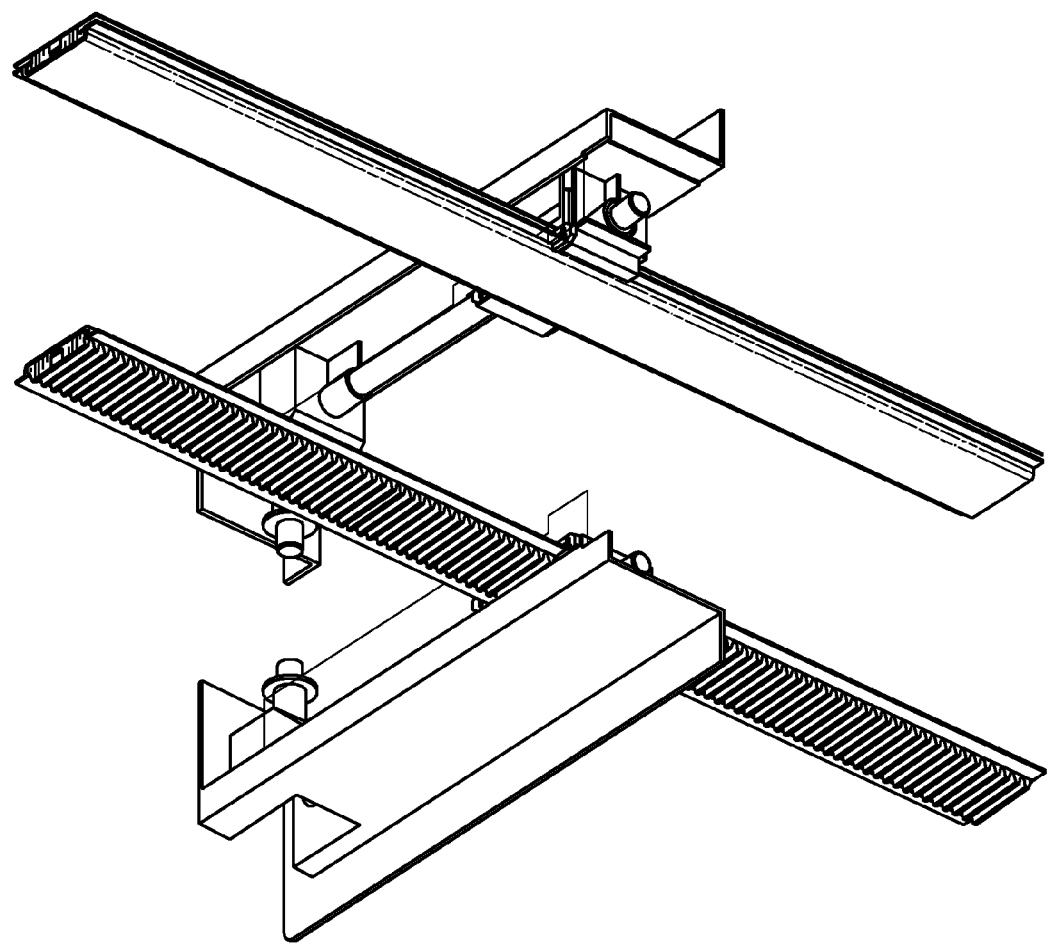
Figure 24:
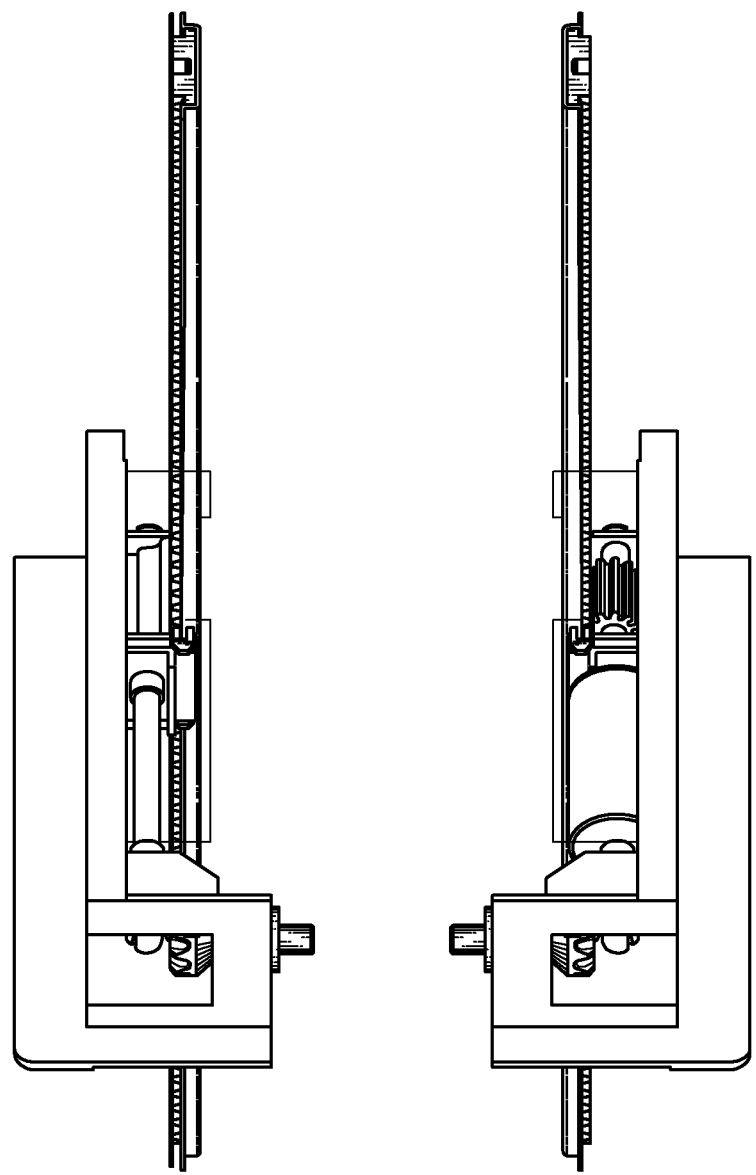
Figure 25:
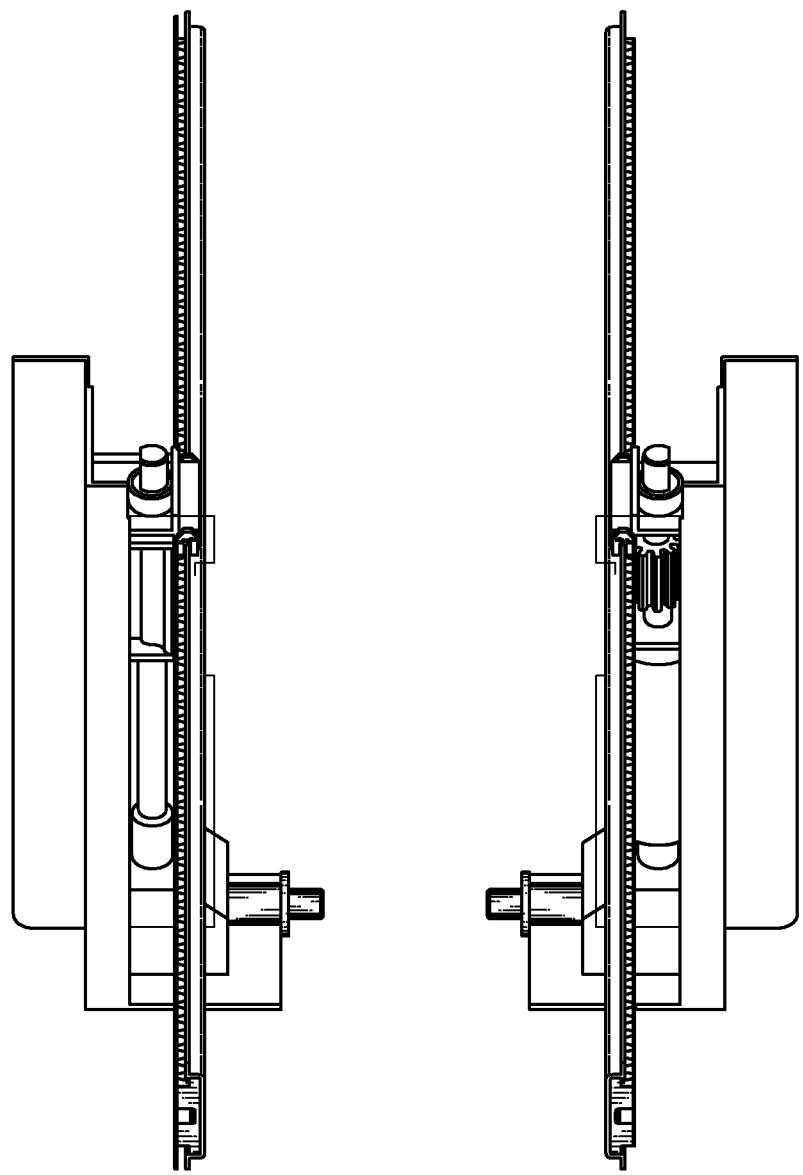

Rotation of drive shaft 72 and auxiliary drive shafts 90, through bevel gear sets 80, serve to move the slide out room assembly between retracted and extended positions when rotating drive gears 94 engaging rack gear assemblies 100 attached to the slide out room assembly, thereby translating the rotational motion of the motor 73, via shafts, bevel gears, and drive gears into linear motion. This is illustrated clearly in at least FIGS. 8 and 9.

The present illustration shows four rack gear units 100, with two positioned on the top of the slideout unit and two on the bottom of slideout unit, as will be discussed in more detail later herein. However, it is to be appreciated that while a minimum number rack gear sets for utilization in the present invention is two, any number in excess of two may be utilized. As it relates to orientation of rack gear sets 100, multiple orientations are possible, provided that at least one drive gear 94/rack gear assembly 100 is provided on at least each of two opposing sides of a slideout unit, even if the number on such opposing sides is not equal. The length of rack gear units 100 will define the amount of travel capable from the slideout unit 24, but the width and tooth count of rack gear is subject to preference. Drive gears 94 for driving cooperating rack gear assemblies 100 may be located on either drive 72 or auxiliary shafts 90.

Figure 26:
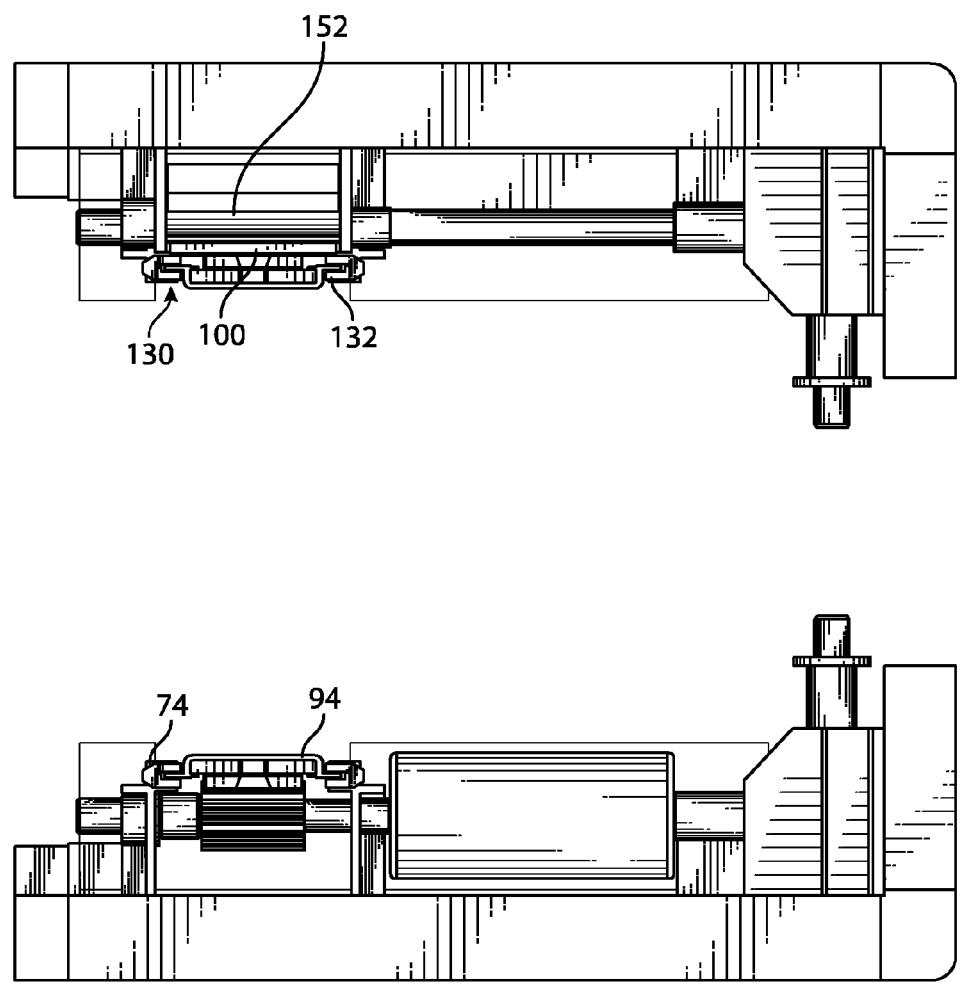
FIG. 26 is a front view of top and bottom corner portions of a slideout unit in accordance with this invention.
Figure 27:
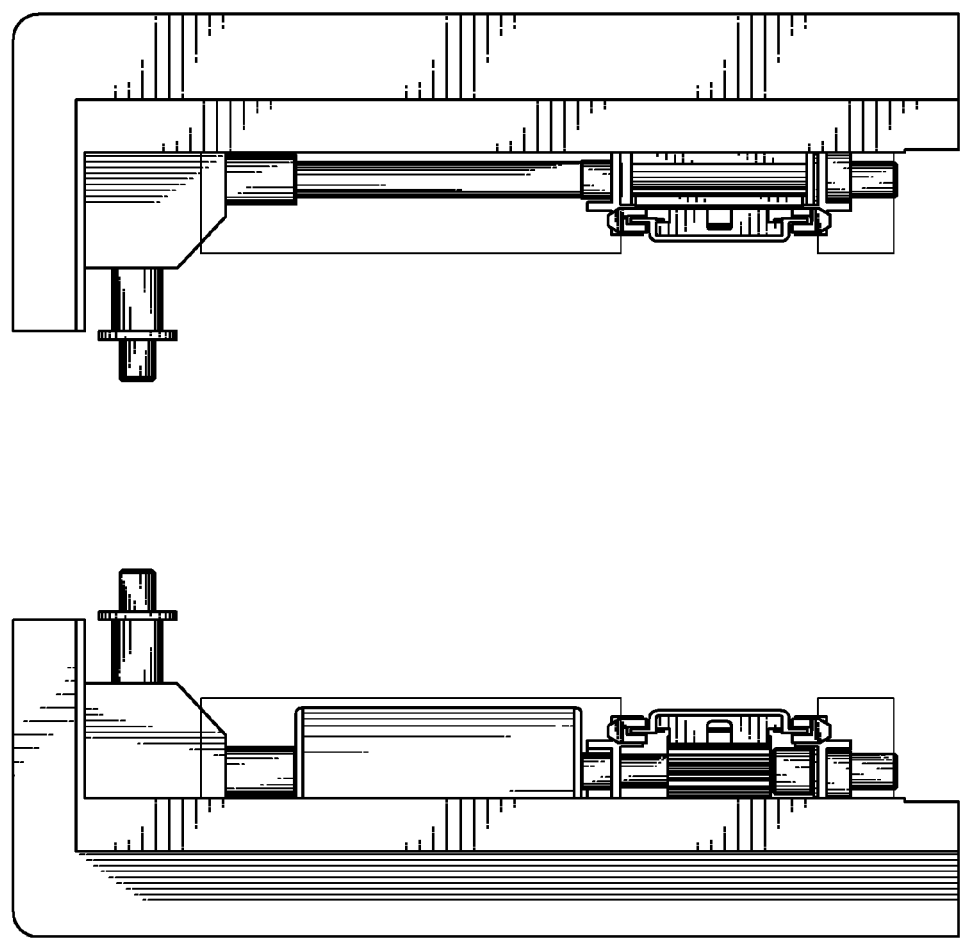
FIG. 27 is a back view of top and bottom corner portions of a slideout unit in accordance with this invention.
Figure 31:
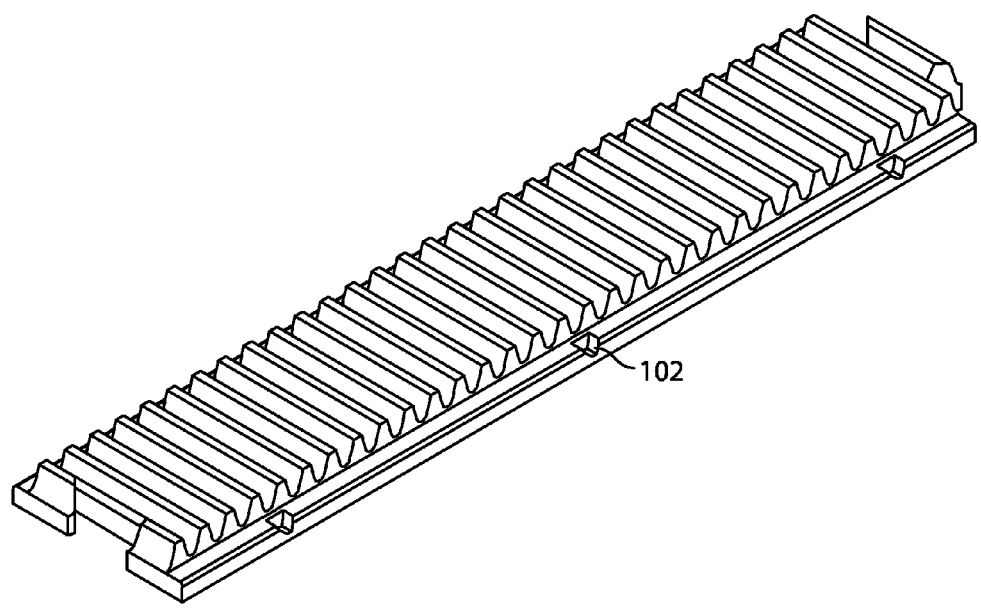
FIG. 31 is a perspective view of a tooth portion of the rack mechanism used in conjunction with a slideout unit in accordance with this invention.
Figure 32:
FIG. 32 is a side view of a tooth portion of the rack mechanism used in conjunction with a slideout unit in accordance with this invention.
Figure 33:
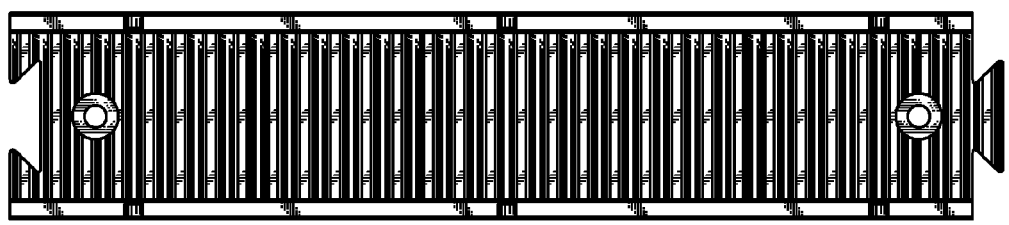
FIG. 33 is a top view of a tooth portion of the rack mechanism used in conjunction with a slideout unit in accordance with this invention.

Rack gears 102 used herein are similar to those known in the art are shown in FIGS. 31-33. As shown, the rack gears 102 are machined or molded and may be produced as a single unit or comprised of sections, such as 8 to 10-inch sections which can be linked together by means known in the art. FIG. 33 illustrates a dovetail fit which satisfies this requirement. A rack housing 110 serves to hold the rack gear 102 or rack gear sections therein by means well known in the art and may provide additive structural integrity thereto. An example is shown in FIG. 26 wherein rack gear 102 is retained within a track formed in housing 110 and/or crimped therein by the application of force. Conventional means of attachment such as rivets, bolts, adhesive and the like are contemplated. One qualified housing 110 is that extruded from aluminum or plastic. Molded rack gears 102 or gear sections are contemplated. Holes in rack gears 102 can be used as desired and as appropriate to make attachment of the rack gear 102 to the rack housing 110 or to the roof or floor in the present embodiment (alternatively opposing sides) of the slideout unit 24. Brackets 106 are used to attach opposite ends of rack gear assembly 100 to the slideout unit 24 (see at least FIGS. 4-7, 10-13). As perhaps best illustrated in FIG. 10, a floating bracket 106 which captures the terminal end of a rack gear assembly 100, but allows the terminal end of the assembly to travel up and down within the bracket 106 is a good but not required choice due variables such as taper in the slideout unit or the angle of the slideout unit's travel. Fixed brackets 106 which restrict travel within the bracket are also contemplated and may be desired especially in configurations with rack gear assemblies 100 positioned along the floor of a slideout unit 24. Any combination of fixed or floating brackets may be used.

Now in looking at FIGS. 14-27, it can be seen the rack guides 130 capture the rack gear housing 110 via side flanges 111 to facilitate and maintain the interface between drive gears 94 and the rack gear assembly 100. It can be appreciated that numerous ways in which to accomplish such interface are known and the invention shall not be restricted to the manner shown herein. Rack guides 130 may contain inserts 132 to allow a snug but not tight fit and facilitate smooth movement of the assembly within guides 130. Suitable inserts 132 may be a low friction material, such a plastic or silicon-coated material. As can be seen in these same figures, attached to corner members 62a-d are optional wipe members 140 which fill the space between the room and the jamb, and are also in mild contact with the side, bottom, or top of the slideable unit 24 to remove moisture or debris (such wipe members 140 can be located on the inside, outside, or both sides of corner members 62 and/or midframe members 68. In certain instances, it may be preferable not to install wipe members 140 along the outside of bottom corner members 62c and 62d, in an effort to avoid accumulation of debris or moisture within the jamb of the slideout frame 60. Wipe members 140 capable of achieving the stated purpose may take many forms including a unitary piece of material or a multi-piece construction, with or without removable or replaceable interfaces with the adjacent surface.

Figure 28:
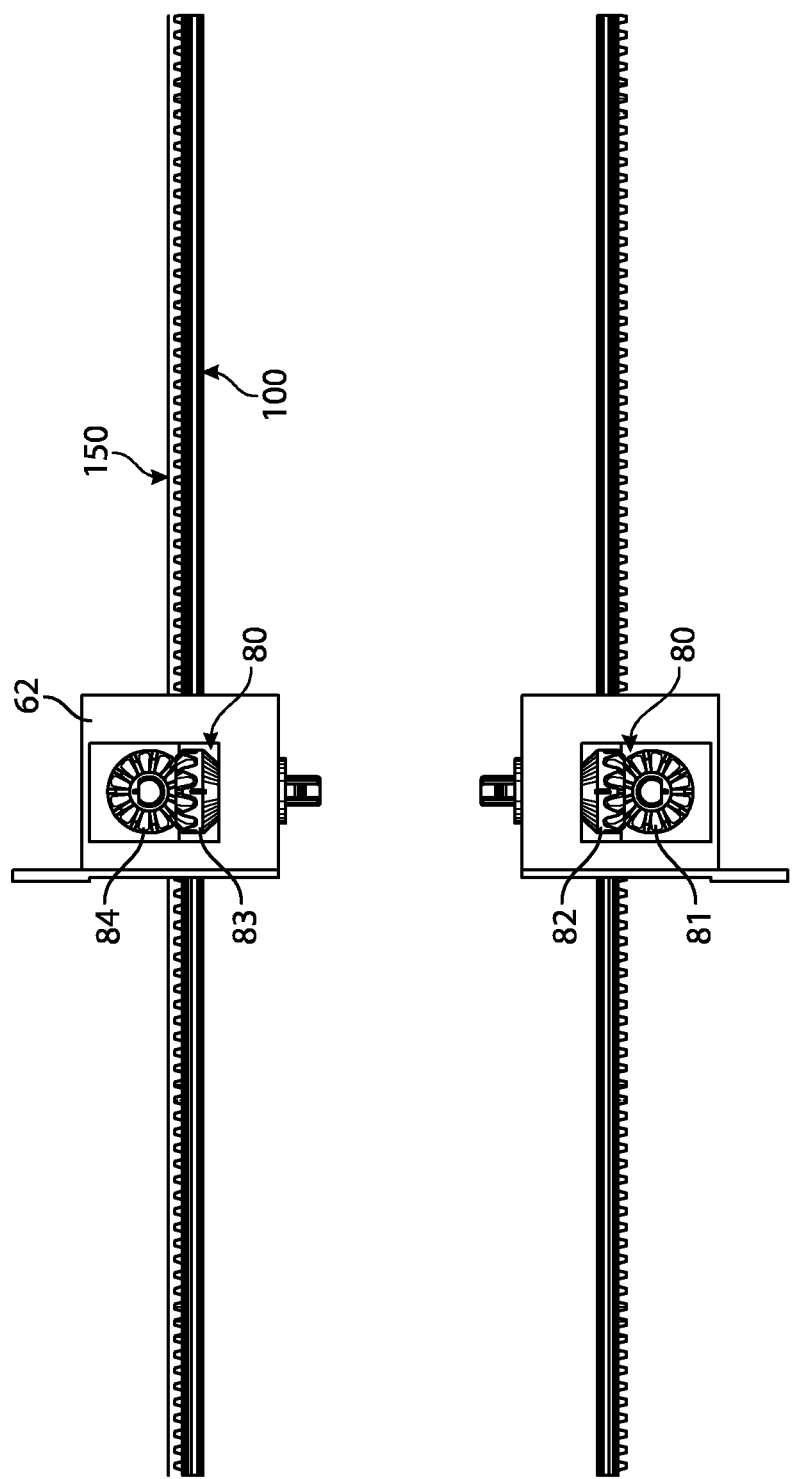
FIG. 28 is an outer side view of top and bottom corner portions of a slideout unit in accordance with this invention.
Figure 29:
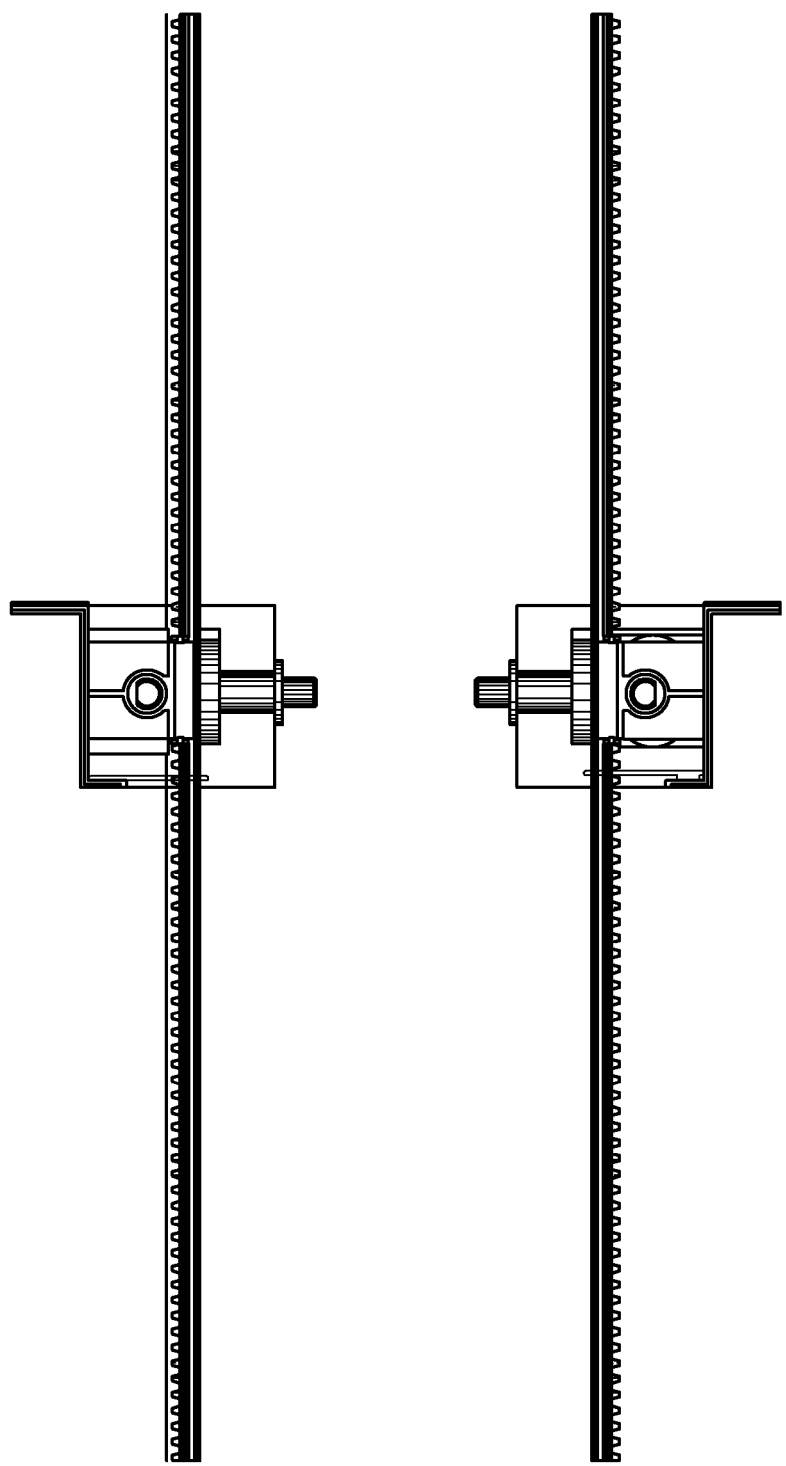
FIG. 29 is an inside side view of top and bottom corner portions of a slideout unit in accordance with this invention.
Figure 30:
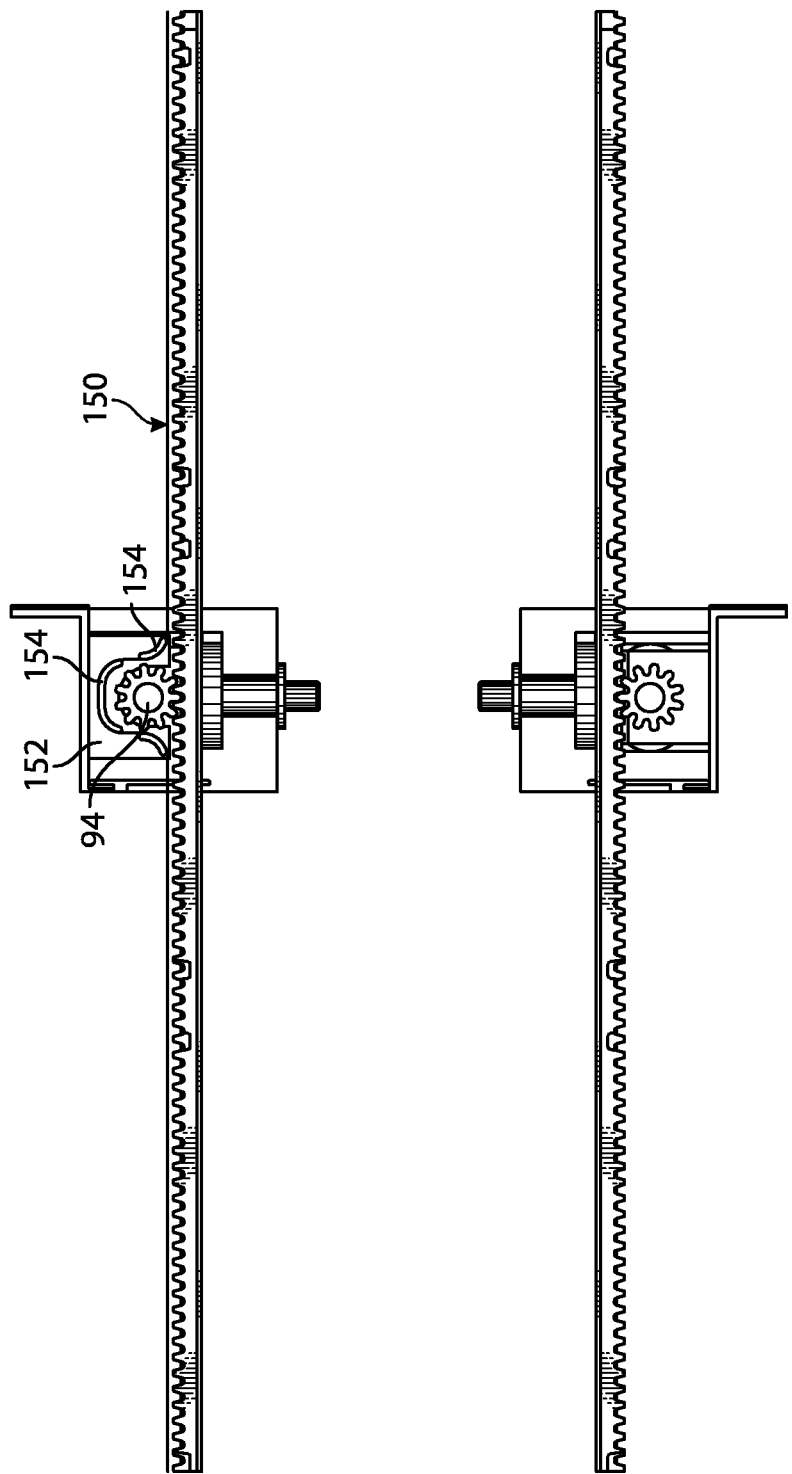
FIG. 30 is an inside side view of top and bottom corner portions of a slideout unit in accordance with this invention, wherein a portion has been cut away to illustrate the internal mechanisms therein.

In certain environments, it may be desirable to protect the rack assemblies from dirt, debris, and/or moisture especially, but not exclusively, rack assemblies mounted to the ceiling or upper surface of slideout units. To this end, a protective surface 150 may be utilized to cover vulnerable portions of rack assemblies 100, as illustrated in FIGS. 28-30. Now as best viewed in FIGS. 20-21, 24-27, the protective surface 150 may be a thin membrane or sleeve which travels along any portion of rack assembly 100 that may be subject to the accumulation of unwanted material. However, it is appropriate that the protective surface 150 not enter the engagement between a drive gear 94 and a rack gear 102. Thus, a router 152 is employed to channel protective surface 150 around such a gear engagement. FIG. 30 illustrates the router 152 and a series of travelers 154 therein which help to move the protective surface 150 away from the drive gear/rack gear engagement as the slideout unit 24 is moved between retracted and extended positions. Alternatively, protective surface 150 could be collected and dispensed via an arrangement of one or more spools in which such spools are biased take up excess slack as the rack assembly moves.

A limit stop may be provided to limit outward movement of the slideout unit 24.

Operation of an apparatus according to one embodiment of this invention will now be described with reference to all of the FIGS.

When it is desired to move slideout unit 24 from the first or retracted position shown in FIG. 1 to the second or extended position shown in FIG. 2, motor 73 is started by means of a switch (not shown) and is caused to turn in one direction. Motor 73 drives sprocket 70, which in turn drives drive shaft 72. This causes drive gears 94 in direct connection with drive shaft 72 to rotate and move their associated rack assemblies 100 along a linear path. The rotational energy of motor 73 is further translated to sets of bevel gears 80 located in the corner areas of the frame proximal to and on either side of the motor 73. This rotational energy is further translated to auxiliary or timing shafts 90 extending away from these bevel gears 80 to additional sets of bevel gears 80 located distal to motor 73 and further to additional timing shafts 91 (or a single timing shaft) to power drive gears 94 causing movement of associated rack assemblies 100. Note that motor 73 according the present invention may be positioned at any point along the pathway of shafts and bevel gears, even though by example only motor 73 is shown as located below the slideout unit, and centered relative to adjacent corner members. This system of bevel gears 80 and drive/timing shafts 72/90/91 allows the movement of each drive gear 94/rack assembly 100 to be synchronized or timed with other drive gear 94/rack assemblies 100 located on the same slideout unit. Further, additional motors may be added to this assembly in a manner similar to motor 73 and in order to assist with load of the slideout unit 24 without affecting the operation thereof. The interconnection between drive shaft(s), auxiliary shafts 90/91 and bevel gear sets 80 allows the slideout unit 24 to move in unison throughout all corners of unit 24.

In an alternate embodiment (not shown), the motor 73 is not provided and the slideout unit is only manually driven. This would be used where the slideout unit 24 is a storage unit 26. For such manually driven units, an adapter or handle could be provided on sprocket 70 to permit manual rotation of sprocket 70 to reciprocate the storage unit 26 or the storage unit could be manually moved by means of handles 50, 54.

The present invention affords a simple and reliable drive mechanism for a vehicle slideout unit. This drive mechanism is simpler and more reliable than vehicle slideout drive systems that are presently known. The drive mechanism of the present invention assures that the slideout unit will advance and retract smoothly and evenly, whether power is applied manually or with a motor. Because of the simplicity of the present drive mechanism, there is less that can go wrong than is the case with presently known vehicle slideout operating systems.

These and other advantages are obtained in assemblies according to this invention.

While the present invention has been described with particular reference to a vehicle, it will be seen that this invention is also applicable to other structures. Such structures may comprise a base unit (or first module) and a slidable unit (or second module) that is reciprocable in an opening in a wall of the base unit between first and second positions relative to the base unit. For example, this invention may be applied to a cabinet having a wall with one or more openings and comprising one or more drawers, each of that is slidably mounted in such opening and is moveable in a reciprocating manner between a closed position and an open position. In general, this invention is particularly useful for the movement of reciprocating members having substantial weight as, for example, a slideout unit of an automotive vehicle.

While this invention has been described in detail with respect to specific embodiments thereof, it shall be understood that such description is by way of illustration and not by way of limitation.

Various modifications can be made without departing from the scope and spirit of this invention.

What is claimed is:

1. A slidable room assembly in a vehicle body, the vehicle body having a plurality of exterior walls, at least one of which has an opening and a slideout unit disposed in the opening and reciprocable between an extended position and a retracted position, the slidable room assembly comprising:
   a slideout unit frame insertable into the opening;
   a drive shaft having a first end and a second end, and a means for rotation of the drive shaft, the first end and the second end each being connected to one or more first bevel gear sets adapted to redirect the rotational motion of the drive shaft;
   one or more first auxiliary members each having a top end and bottom end, the one or more first auxiliary members bottom ends being operatively connected to the one or more first bevel gear sets for rotation thereby;
   one or more second bevel gear sets each operatively connected to the top ends of the one or more first auxiliary members, the one or more second bevel gear sets adapted to redirect the rotational motion of the one or more first auxiliary members;
   one or more second auxiliary members operatively connected to the one or more second bevel gear sets for rotation thereby; and
   at least two rack gear systems, each rack gear system comprising:
      at least one drive gear located on either the drive shaft or the first or second auxiliary members and
      at least one rack gear connected to the slideout unit frame, and aligned and associated with the at least one drive gear for linear movement of the slideout unit relative to the opening.

2. The slidable room assembly of claim 1 wherein the first rack gear system is disposed on an opposite side of the slideout unit frame than the second rack gear system.

* * * * *